US012548406B2

(12) United States Patent
Atkinson et al.

(10) Patent No.: US 12,548,406 B2
(45) Date of Patent: Feb. 10, 2026

(54) GAMING SYSTEMS AND METHODS USING DYNAMIC GAMING INTERFACES

(71) Applicant: LNW Gaming, Inc., Las Vegas, NV (US)

(72) Inventors: Lyal Atkinson, Mascot (AU); James Norman Preston, Greenvale (AU); Ray Shakoori, Carlingford (AU)

(73) Assignee: LNW Gaming, Inc., Las Vegas, NV (US)

( * ) Notice: Subject to any disclaimer, the term of this patent is extended or adjusted under 35 U.S.C. 154(b) by 328 days.

(21) Appl. No.: 18/471,439

(22) Filed: Sep. 21, 2023

(65) Prior Publication Data

US 2024/0119796 A1 Apr. 11, 2024

Related U.S. Application Data

(60) Provisional application No. 63/413,692, filed on Oct. 6, 2022.

(51) Int. Cl.
*G07F 17/32* (2006.01)

(52) U.S. Cl.
CPC ...... *G07F 17/3262* (2013.01); *G07F 17/3209* (2013.01); *G07F 17/3213* (2013.01)

(58) Field of Classification Search
None
See application file for complete search history.

(56) References Cited

U.S. PATENT DOCUMENTS 7,421,650 B2 * 9/2008 Zettel ...................... G06F 40/10 715/239
7,684,874 B2 * 3/2010 Schlottmann ....... G07F 17/3211 463/9
7,736,221 B2 * 6/2010 Black .................. G07F 17/3223 463/40
8,087,984 B2 * 1/2012 Okujyo ............... G07F 17/3276 463/11
8,172,683 B2 * 5/2012 Kelly .................... G07F 17/323 463/41
8,398,489 B2 3/2013 Lutnick et al.
8,414,372 B2 * 4/2013 Cannon ................. G07F 17/326 463/16
8,647,188 B2 * 2/2014 Kelly .................. G07F 17/3211 463/16

(Continued)

*Primary Examiner* — Seng H Lim

(57) ABSTRACT

A gaming system comprising a presentation assembly, one or more player input devices, and game-logic circuitry. The presentation assembly presents a multi-game management interface including presentation elements for participating game slots, active games, and search tools and a multi-game interface for playing games associated with the game slots. The game-logic circuitry collects game data for active games, compares, in response to player selection of a first search tool, the collected game data to predefined search criteria of the first search tool. The presentation assembly updates the presentation elements of the active games to be organized based on the comparison, visually links the presentation element of a first participating game slot with the presentation element of a first game in response to player input adding the first game, and unlinks, in response to player input removing the first game, the presentation elements of the first game and the first game slot.

24 Claims, 19 Drawing Sheets

(56) References Cited

U.S. PATENT DOCUMENTS

| | | | | |
|---|---|---|---|---|
| 9,592,450 | B2 | 3/2017 | Chun | |
| 10,607,435 | B2 | 3/2020 | Lutnick et al. | |
| 10,916,087 | B2 * | 2/2021 | Oberberger | G07F 17/3213 |
| 2006/0068907 | A1 * | 3/2006 | DiMichele | A63F 13/23 463/30 |
| 2006/0154715 | A1 * | 7/2006 | Black | G07F 17/32 463/13 |
| 2008/0070667 | A1 | 3/2008 | Lutnick et al. | |
| 2011/0009181 | A1 | 1/2011 | Speer, II et al. | |
| 2011/0269545 | A1 * | 11/2011 | Kelly | G07F 17/3211 463/40 |
| 2013/0310156 | A1 * | 11/2013 | Gadher | G07F 17/3237 463/25 |
| 2014/0364203 | A1 * | 12/2014 | Nelson | G06Q 20/322 463/31 |
| 2016/0253865 | A1 * | 9/2016 | Men | G07F 17/3225 463/25 |

* cited by examiner

FIG. 8
LOBBY
SELECT YOUR GAME
ROULETTE
SICBO
BACCARAT
BLACKJACK
STADIUM
CASINO
CASINO WAR
3CARD POKER

600

FIG. 9
BACCARAT
ADD GAME
BANKER
PLAYER
TIE
BANKER PAIR
PLAYER PAIR
NATURAL
GAME MESSAGES
BANKER WINS
PLAYER
BANKER
Player Pair
Super 6
Banker Pair
Player
Tie
Banker
3

700

800

1000

FIG. 13
ACTIVE TABLES
TABLES AVAILABLE
TABLE 01
TABLE 02
TABLE 03
TABLE 04
TABLE 05
TABLE 06
TABLE 07
TABLE 08
TABLE 09
TABLE 11
TABLE 12
22
EMPTY
DRAG TABLE HERE
$2
$5
$20
$1,337.00

1100

GAMING SYSTEMS AND METHODS USING DYNAMIC GAMING INTERFACES

CROSS-REFERENCE TO RELATED APPLICATIONS

This application claims the benefit of priority to U.S. Provisional Patent Application No. 63/413,692, filed Oct. 6, 2022, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations and interfaces in connection with a multi-game feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

At least some gaming systems and apparatus are configured to provide multiple games for play by players, thereby increasing the player participation without requiring the players physically relocate between machines or tables to play in a variety of games at once. A significant technical challenge to such systems is the computational, storage, and/or network resource burden accrued through running multiple game instances concurrently within the gaming machines, thereby impacting performance of the game presentation and administration. Moreover, the resource burden limits the ability of such systems to provide a flexible and configurable multi-game system to both operators and players by limiting the number of concurrent games. Accordingly, improvements to the flexibility of such gaming systems while traversing the corresponding resource limits are needed within the industry.

Moreover, another significant technical challenge is to improve interfacing capabilities of multi-game systems for players to configure the multi-game experience without exceeding the remaining resources beyond the active games. Some known systems are rigid in the configuration of the games, where the player is presented an interface with predefined games that may or may not be to their liking. To provide a variety of games and configurations, there is a need for a system that can enable players to select and customize the active games. In combination with this need, another technical challenge arises. More specifically, to provide customization to the players, the operators of the games can provide a number of games that exceed the limits of the gaming machine of the player. Accordingly, there is a need for a multi-game system with intuitive interfaces for navigating, selecting, and customizing the games of a gaming session.

SUMMARY OF THE INVENTION

According to an embodiment of the present invention, there is provided a gaming system, gaming machine, and method that utilize a presentation assembly configured to present a game interfaces for a plurality of games, one or more player input devices, and game-logic circuitry configured to cause the presentation assembly to present a multi-game management interface including presentation elements for a plurality of participating game slots, a plurality of active games, and search tools, collect, for each active game, game data that is at least associated with historical game events and conditions of the game and that is at least partially presentable within the multi-game management interface, compare, in response to detecting, via the one or more player input devices, a player selection of a first search tool of the search tools, the collected game data to predefined search criteria of the first search tool, cause the presentation assembly to update the presentation elements of the plurality of active games to be organized based on the comparison, cause, in response to detecting, via the player input devices, player input adding a first active game, the presentation assembly to visually link the presentation element of a first participating game slot with the presentation element of the first game such that a player associated with the player input is entered as a participant to the first game concurrently with any other games within the participating game slots via a multi-game interface presented by the presentation assembly, and cause, in response to detecting, via the player input devices, player input removing the first game, the presentation assembly to remove the first game from the multi-game interface and unlink the presentation elements of the first game and the first game slot such that the player input removes the player as a participant within the first game.

Additional aspects of the invention will be apparent to those of ordinary skill in the art in view of the detailed description of various embodiments, which is made with reference to the drawings, a brief description of which is provided below.

Figure 1:
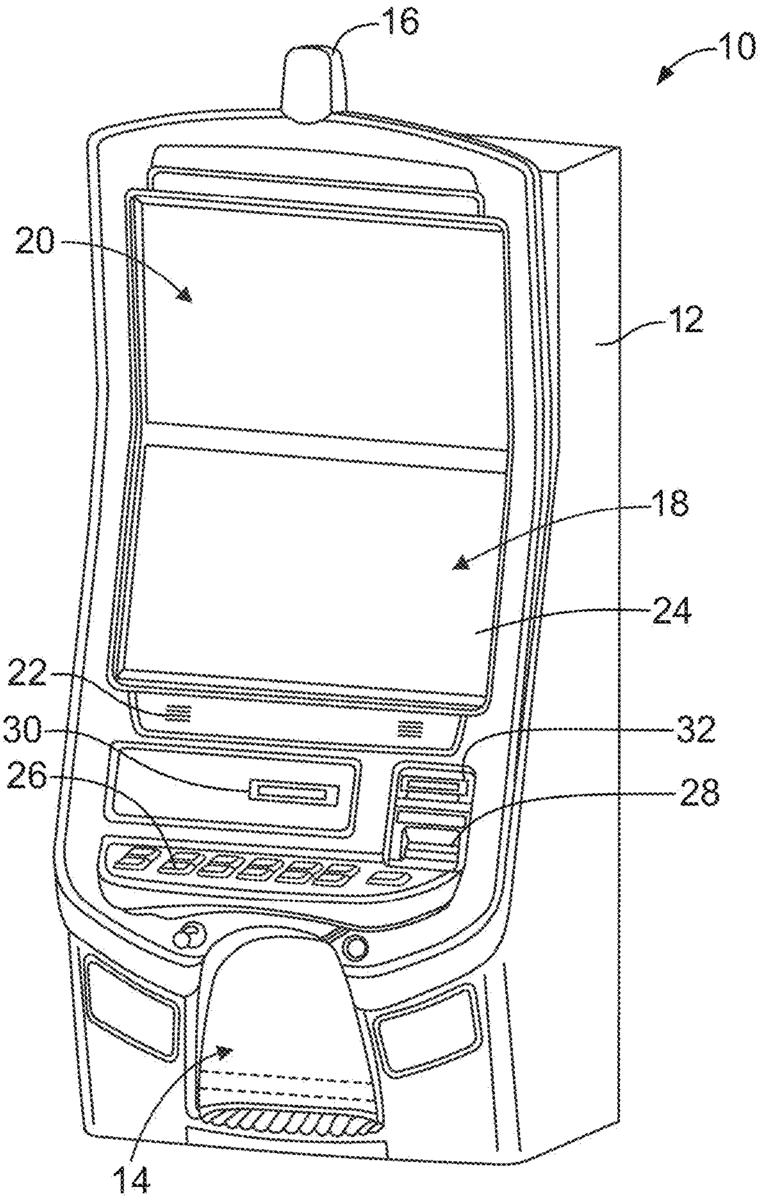
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

As used herein, the term "participant" refers to a player that is actively playing a game, queued for a game, associated with a game "seat" (i.e., a limited number of slots associated with a game), and the like. That is, the player may be considered a participant of a game even if the player has not yet performed a player action within a game provided the player is associated with the game within the gaming system as described herein. A player is "added" as a participant to a game by associating the player with the game, whereas the player is "removed" from the game as a participant by removing the association between the player and the game.

The systems and methods described herein include functionality that is performed in response to player input. Where a function of the systems and methods are described as responsive to a player input, it is to be understood that the function may be directly responsive to one or more inputs (i.e., a sequence of player inputs) or indirectly response to the inputs such that one or more intervening steps may be performed. The type of player input is adapted to the particular configuration of presentations and player input devices of the systems described herein. For example, touchscreen-based gestures to add or remove games to a multi-game gaming session as described herein may include selecting a presentation element of the game, performing a gesture to indicate the desired function (e.g., drag and drop, swipe, etc.), and a confirmation icon is selected, or corresponding gesture is performed to execute the indicated function. Accordingly, where "player input" is described herein, it is to be understood that the player input may include several inputs and/or intervening functions to facilitate the player input (e.g., presenting an input prompt on a game interface to confirm the desired functions).

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-7), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
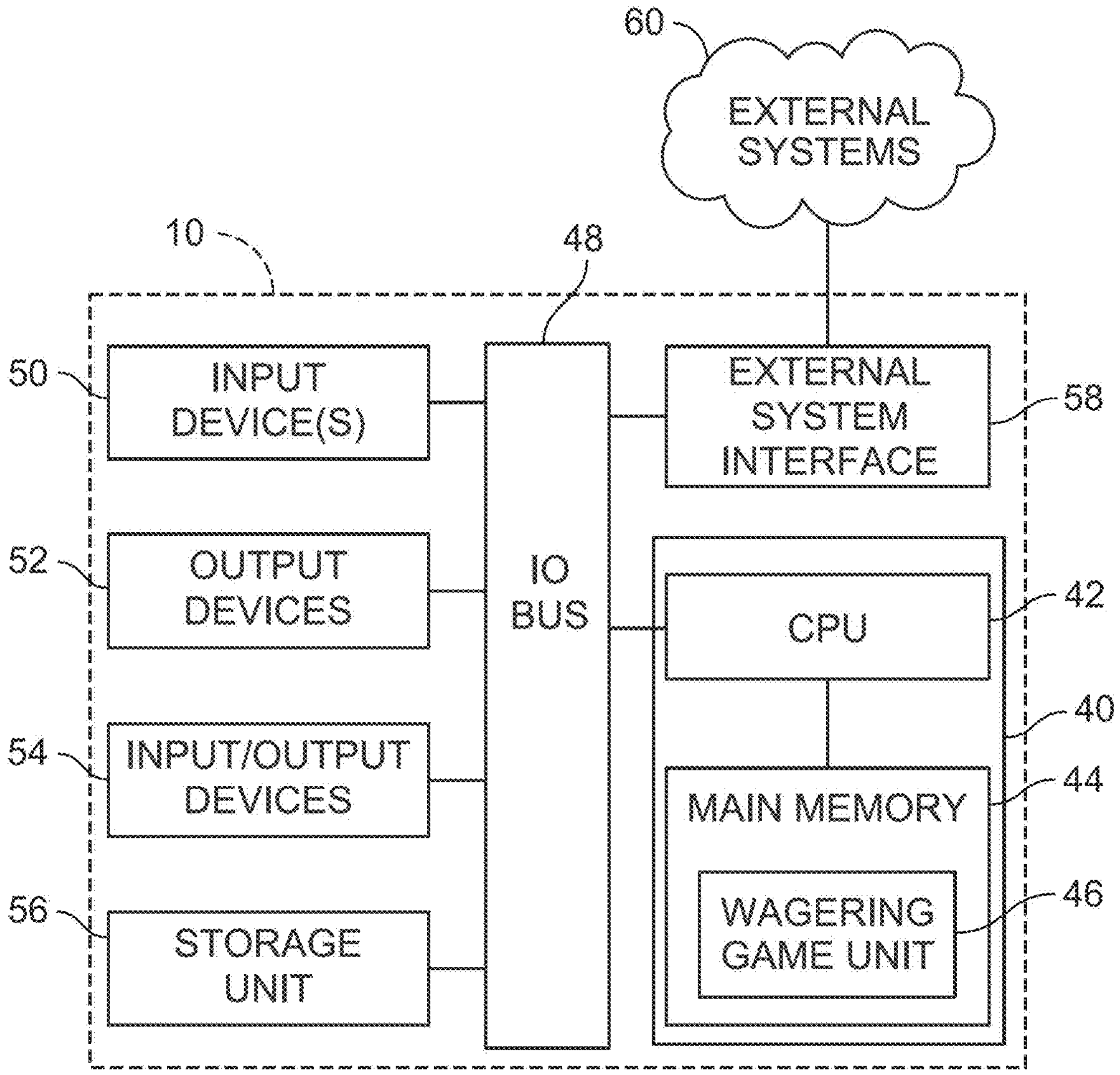
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

The embodiments described herein include gaming systems configured to facilitate multi-game gaming sessions. More specifically, a player initiates a gaming session at a gaming machine and can participate within one or more games concurrently within the gaming session. For example, the player may participate within two or more games of baccarat and/or a different game (e.g., roulette, sic bo, poker, blackjack, reel-based games, etc.) concurrently through one or more game interfaces presented by the gaming machine. The gaming machine is configured to present, in addition to the game interfaces, one or more management interfaces that enable the player to intuitively customize their gaming session without exceeding the resources of the gaming machine.

Figure 3:
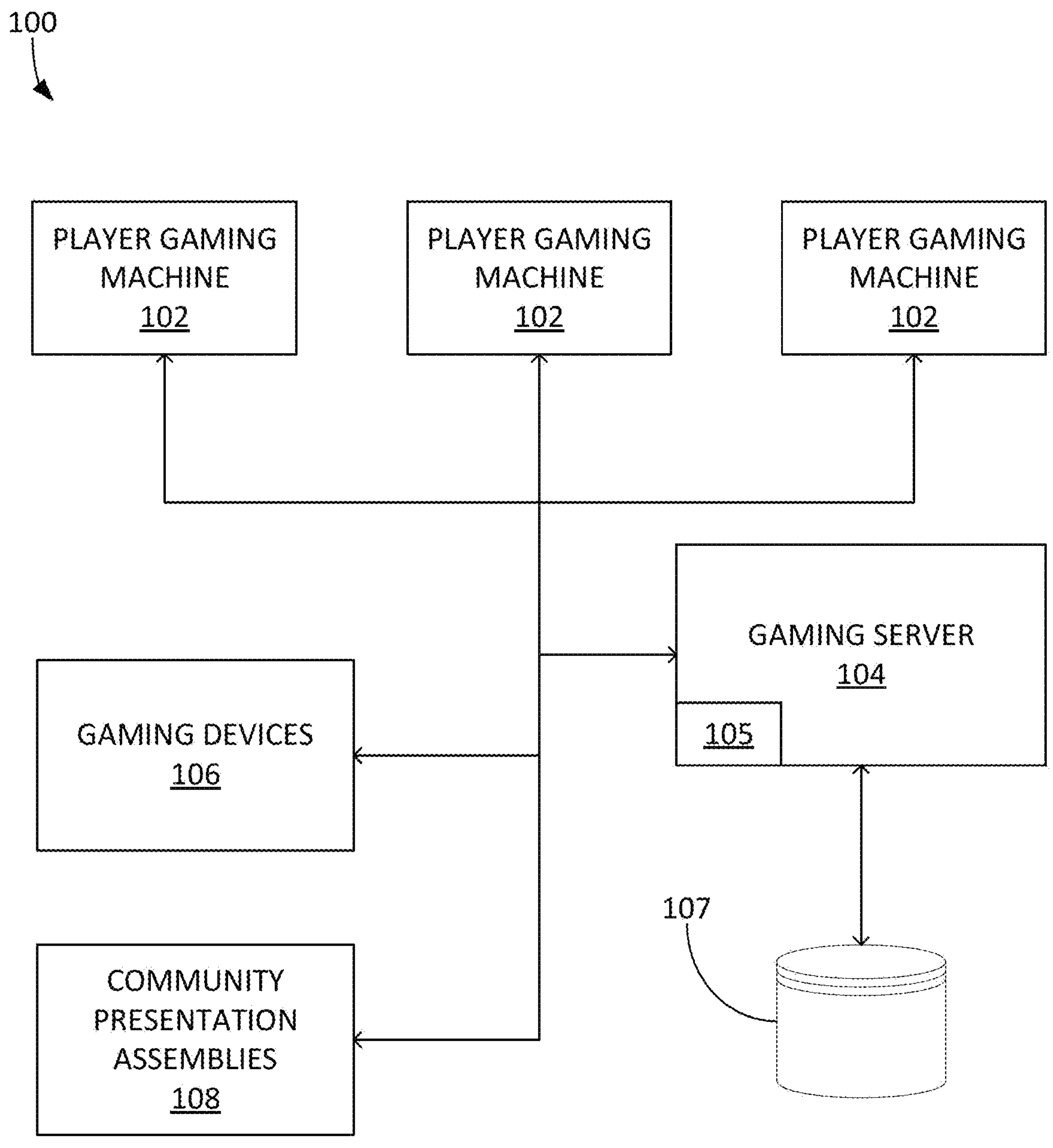
FIG. 3 is a block diagram of an example gaming system for multi-game gaming sessions, according to an embodiment of the present invention.

FIG. 3 is a block diagram of an example gaming system 100 configured for multi-game gaming sessions. The system 100 includes a plurality of player gaming machines 102, a gaming server 104, gaming devices 106, and one or more community presentation assemblies 108. In other embodiments, the system 100 may include additional, fewer, or alternative devices, including those described elsewhere herein.

The player gaming machines 102 may be similar to or different from the gaming machine 10 (shown in FIG. 1). The player gaming machines 102 are configured to provide players access to the games provided by the system 100. That is, the player gaming machines 102 include presentation assemblies to present the games and corresponding interfaces, input devices to receive player input for the games, and/or game-logic circuitry to manage and administer the games. The gaming machines 102 may be free standing machines for a single player, multiplayer machines on which multiple players can participate, portable devices, and/or personal devices of the player (e.g., a smartphone with an application associated with the system 100 installed or a laptop accessing a web page associated with the system 100). In certain embodiments, the gaming machines 102 may include terminals installed within hybrid gaming assemblies, such as a gaming table including at least one physical gaming device 106 (e.g., a dice shaker, roulette wheel, etc.).

The player gaming machines 102 are in communication with the gaming server 104 to administer the games of the system 100. The gaming server 104 includes logic circuitry 105 that may be similar to the logic circuitry 40 (shown in FIG. 2) to facilitate the functions described herein. The gaming server 104 may be a single centralized device or a distributed system in which functionality of the gaming server 104 is divided across several devices in communication with each other. For example, the gaming server 104 may include a computing device configured to manage the game logic of any active games and another computing device configured to manage the accounting of any placed wagers and provided awards.

In certain embodiments, at least a portion of the game logic is provided by the gaming server 104. That is, for a given game, the gaming server 104 executes at least one game determination (e.g., generating a game outcome, determining awards, etc.) that is communicated to the player gaming machines 102 for presentation. The player gaming machines 102 may be configured to supplement these game determinations with additional determinations performed locally and/or convert the communicated game determinations into a game presentation. In certain embodiments, one or more games of the player gaming machines 102 are determined without any game determinations from the gaming server 104. For example, a single player game may not require external game determinations. In another example, the game determinations within a multiplayer game may be performed peer-to-peer by the gaming machines 102, where the game determinations are performed by one or more gaming machines 102 and circulated to the relevant machines 102 for presentation.

In the example embodiment, the gaming server 104 is configured to monitor active games hosted by the gaming system 100. That is, the gaming server 104 collects game data for the active games and determines the participants of each game. The game data include, for example and without limitations, game outcomes, game trends, game events, wager events and conditions, and the like. The gaming server 104 monitors the participants of the games and detects whether or not each game has an open "seat," where each seat refers to a participation slot in which a player can participate within the game. Some games do not distinguish between different seats (i.e., each player can perform the same actions as players in other seats) while other games may include differences between seats (e.g., table seats in which players participate within the game and back betting seats in which the player wagers on events controlled by other players). These differences may change throughout the game, such as a 'banker' designation within baccarat. In certain embodiments, one or more games may not have limited seats such that all player gaming machines 102 can participate in a given game.

In at least some embodiment, the gaming server 104 is in communication with a game database 107 to store the monitored game data, the participant list, and/or other suitable data, including data described herein (e.g., search tool criteria). In the illustrated embodiment, the game database 107 is a separate device from the gaming server 104. In other embodiments, the game database 107 is at least partially integrated within the gaming server 104. In certain embodiments, the game database 107 may be additionally or alternatively integrated within other devices, such as the player gaming machines 102.

In the example embodiment, the player gaming machines 102 and/or the gaming server 104 are in communication with one or more gaming devices 106. The gaming devices 106 may include, for example and without limitation, devices that manipulate, host, and/or are otherwise associated with physical gaming elements, such as dice, cards, roulette wheels, and the like. The gaming devices 106 may additionally or alternatively include devices with digital gaming elements, such as projected presentations emulating physical gaming elements. The gaming devices 106 are configured to generate game outcomes or game events for the games associated with the system 100. For example, one or more dice games administered by the gaming server 104 are based on a dice shaker of the gaming devices 106, where the dice shaker automatically shakes a set of dice to generate a dice outcome. Players participate in the dice games through the player gaming machines 102 to perform player actions (e.g., wager). In another example, one or more roulette wheels of the gaming devices 106 are used to generate outcomes associated with the gaming sessions at the gaming machines 102. The gaming devices 106, in addition to the corresponding gaming elements, may include other suitable components to facilitate the functionality of the system 100, such as and without limitation, sensors for detecting the gaming elements, logic circuitry, and/or network components.

In certain embodiments, one or more gaming devices 106 is integrated with the player gaming machines 102 and/or the gaming server 104. For example, a roulette wheel of the devices 106 is installed within a gaming table, the and a plurality of player gaming machines 102 are installed within the table as player terminals. In some embodiments, the system 100 does not include the gaming devices 106. Rather, game events and outcomes are generated by the player gaming machines 102 and/or the gaming server 104.

In the example embodiment, the system 100 further includes one or more community presentation assemblies 108. The community presentation assemblies 108 are configured to present information, game events, and the like associated with the game to the players and bystanders. The community presentation assemblies 108 may include, for example, one or more electronic display devices physically located within sight of the player gaming machines 102 to present communal events, such as major awards, video from the gaming devices 106, communal gaming elements (e.g., communal cards in a poker game), and the like. These presentation assemblies 108 may be configured to present the events using an interface different from the interfaces of the player gaming machines 102 or substantially similar for bystanders to monitor the corresponding game. The community presentation assemblies 108 may be in communication with the player gaming machines 102, the gaming server 104, and/or the gaming devices 106 to facilitate the game presentation. In certain embodiments, the system 100 does not include community presentation assemblies 108, but rather the presentation is focused on the interfaces of the player gaming machines 102.

As described herein, the system 100 is configured to facilitate multi-game gaming sessions. That is, a player can participate within a plurality of games concurrently via the player gaming machines 102. The concurrent games may include multiple instances of the same game type (e.g., two or more concurrent baccarat games) and/or different game types being played. It is to be understood that the term "table" or "gaming table" in this context refers to different game instances unless otherwise specified. The system 100 is further configured to provide customization to the multi-game gaming sessions in an intuitive presentation that enables the system 100 to host a plurality of games that can far exceed the resource limitations of an individual gaming machine 102 without impacting the performance of the machine 102. The system 100 is configured to provide interfaces for the player to customize their view of the games and/or which games to participate in from a list of active games available for participation. Within the management of the participating games, the system 100 is configured to facilitate intuitive searching for the player to navigate the list of active games according to criteria specified by the player, thereby enhancing the ability of the player to find games or tables that match the preferences of the player.

Figure 4:
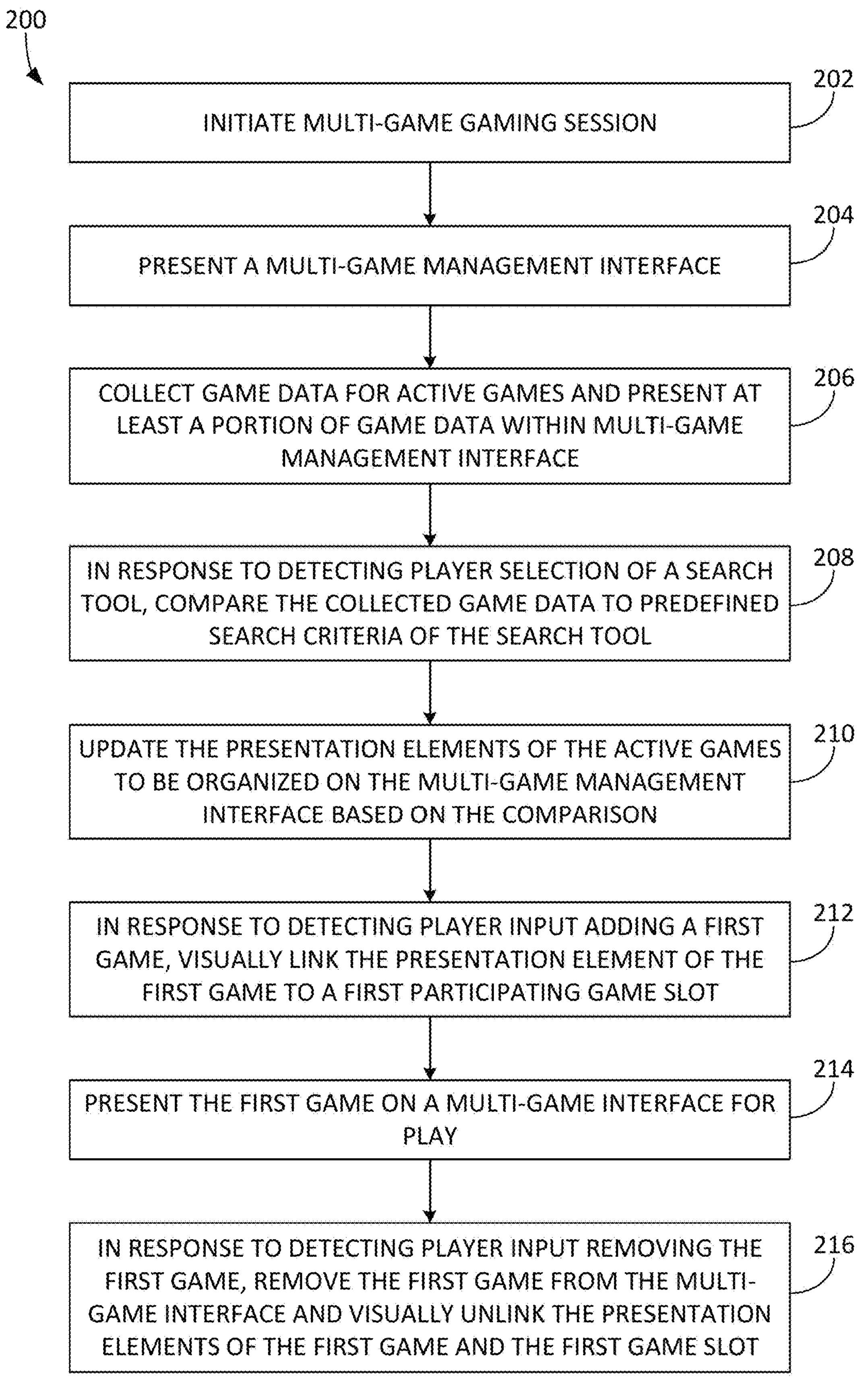
FIG. 4 is a flow diagram of an example method of presenting and managing a multi-game gaming session using a gaming system, according to an embodiment of the present invention.

FIG. 4 depicts a flow diagram of an example method 200 for managing a multi-game gaming session using a gaming system (e.g., the system 100, shown in FIG. 3). The method 200 is at least partially performed by game-logic circuitry of the gaming system, which may include game-logic circuitry of a player gaming machine and/or a gaming server. Additionally, the method is performed with a presentation assembly of a player gaming machine, such as an assembly including one or more electronic display devices for presenting the interfaces described herein. The method 200 is also performed in combination with one or more player input devices that are configured to receive input from the player. The input devices may include, for example, buttons, joysticks, keys, and/or touchscreens. In other embodiments, the method 200 is performed using additional or alternative configurations of the gaming system and/or includes additional, fewer, or alternative steps, including those described elsewhere herein.

In the example embodiment, a player initiates a multi-game gaming session via a player gaming machine at step 202. Initiation of the gaming session may include, for example, providing player input at the gaming machine to establish a credit balance, link a player account to the gaming session, and/or otherwise activate the gaming machine into an initiation state. The player input may include providing a credit input to the gaming machine in the form of one or more physical credit inputs (e.g., coins, bills, tickets, cards, etc.) or providing a credit input through a digital wallet of the player. The credit balance is updated and monitored on the gaming machine via one or more visually presented credit meters that display an updated credit balance responsive to wagers, awards, and/or other credit balance-modifying events.

At the initiation of the multi-game gaming session, the player may be presented an initial selection interface by the player gaming machine. This selection interface enables the player to pick a game type and/or one or more initial games to participate in. In other embodiments, in place of an initial selection interface, the gaming session is initiated in a predefined configuration. In some embodiments, following the initial configuration of the gaming session, the player may be presented a multi-game interface to participate within one or more games. The multi-game interface is configured to present game events (e.g., game outcomes, player wagers, awards, etc.) for the games the player participates in.

The multi-game interface may be configurable to present a plurality of games at once by dividing the interface into different subsections or windows. As used herein, the term "focused game(s)" refers to one or more games presented on the multi-game interface at a given time. The focused games may be presented equally (i.e., the window size, information, player inputs, etc. are the same for each game) or differently. For example, one focused game configuration may include a primary focused game with enhanced window size and/or presented information with one or more secondary focused games that have relatively reduced window size and/or presented information. Non-focused games that the player is participating in are hidden from the multi-game interface. The multi-game interface may include presentation elements for presenting information from the non-focused games and/or presentation elements prompting the player for input to move the non-focused game to the multi-game interface (i.e., converting the selected game to a focused game). This enables the player to efficiently track the game events of multiple games at once and selectively add, remove, or swap games from focused view.

In certain embodiments, the multi-game interface is configured to present up to a predetermined number of focused games at once of a single game type. In such embodiments, each game type may have a different multi-game interface. The multi-game interface may be at least partially similar between game types, where the differences between interfaces are based on the differences between the game types. For example, a poker multi-game interface can share some presentation elements with a roulette multi-game interface, but the different game elements (e.g., the cards, roulette wheel and ball, and the table layouts) and corresponding game information lead to the interfaces having different presentation element configurations. Player input (and, for at some embodiments, corresponding presentation elements) is used to switch between multi-game interfaces. In one or more embodiments, the player may also choose to activate a second multi-game interface having the same game type to participate in additional games and/or to customize the presentation of games to their preference.

To configure the gaming session, the player gaming machine is configured to present a multi-game management interface at step 204. The multi-game management interface is associated with a multi-game interface and enables the player to select games from a list of active games to add to a set of participating game slots. The games within the participating game slots are presentable within the multi-game interface (i.e., the focused and non-focused games) for play of the games. The active games are a plurality of games administered and/or hosted by the gaming system in which players can actively participate in. The participating game slots and the list of active games are represented on the multi-game management interface via corresponding presentation elements. The presentation elements may be associated with certain player inputs that selectively add or remove active games from the participating game slots. For example, if the interface is presented by a touchscreen, the player may drag and drop the active games to and from the participating game slots to add or remove the games as described herein. Other suitable presentation elements and/or visual links between the participating game slots and the active games may be used in other embodiments. For example, the participating game slots may be represented as visual modifiers to the selected active games (e.g., highlighted border, watermark, etc.).

The use of presentation elements to provide a visual and intuitive method of self-managing game participation provides players flexible gaming sessions. Moreover, the number of participating game slots is calibrated to facilitate multi-game gaming sessions within the technical limitations of the gaming machines while enabling the game operators or providers to host a plurality of active games beyond these technical limitations. Moreover, the gaming system is configured to provide the flexibility and technical improvements of the multi-game gaming sessions with enhanced tools and information for the players to customize their gaming session according to their preferences.

In the example embodiment, the gaming system is configured to collect game data for each of the active games and present at least a portion of the collected game data within the multi-game management interface at step 206. The collected game data may include, for example, historical game outcomes, game trends, wager history, award history, number of players, and the like. The game data may be collected on-demand from the gaming machine or gaming server managing a given active game, or the game data is retrieved from database configured to store game data (e.g., the game database 107, shown in FIG. 1). In some embodiments, a portion of the game data is generated based on other game data. For example, the game trends may be generated based on the historical game outcomes. The game data presented by the multi-game management interface is used to inform the player of the current state of the corresponding active game and to distinguish the active games from one another. The game data may be presented through one or more presentation elements (including text-based elements) associated with the presentation element of the active game. The presentation elements of the game data may be selectively presented in a plurality of configurations, where an expanded configuration (e.g., in response to the player selecting the active game) presents more game data relative to a condensed configuration.

To further facilitate player customization and expanded active games lists, the multi-game management interface may include one or more search tools that sort, filter, or otherwise organize the list of active games in a predetermined manner. Each search tool includes predetermined search criteria that is comparable to the collected game data. The predetermined search criteria may incorporate one or more game data elements of the collected game data. In one embodiment, if one game data element is a value-based data element, example search tools may sort the active games in ascending or descending order of the values by comparing each respective game data element to game data elements of other active games. The types and functions of the search tools may be at least partially based on the type of collected game data. That is, search tools intended for baccarat may not apply to roulette because the relevant game data cannot be collected from a roulette game, and therefore these search tools are not accessible within a multi-game management interface for roulette games.

In the example embodiment, the player provides input via the input devices of the gaming machine to select one of the search tools. The player selection is intended to enable the player to customize the list of active games to cater to the preferences of the player for the game selection described herein. In response to the game-logic circuitry of the gaming system detecting the player selection, the game-logic circuitry compares the collected game data to the predefined search criteria of the selected search tool at step 208. In certain embodiments, the player may be prompted to change or adjust the predefined search criteria prior to the comparison. The comparison may be any suitable mathematical operation, logical operation, and the like, including combinations thereof. In one example, the comparison includes comparing value-based game elements associated with each game to each other and/or a threshold value. In another example, the comparison is a logical operation that determines if a Boolean condition is present or absent for each game. It is to be understood that other suitable comparisons and predefined search criteria, including those described elsewhere herein, beyond the examples provided above are considered within the spirit and scope of the present disclosure.

At step 210, the presentation assembly is configured to update the presentation elements of the active games to be organized on the multi-game management interface based at least partially on the comparison. For example, if the selected search tool was a tool for sorting the games, the interface presentation is updated to display the active games according to the selected sort tool. In another example, a filter search tool causes one or more active games to be hidden, removed, or otherwise visually distinguished from other active games. In certain embodiments, the organization of the active games is not limited to the comparison in step 208. For example, if the comparison for a sorting search tool yields a plurality of active games with the same value or weight, the game-logic circuitry is configured to apply predetermined tiebreaker criteria to sort these active games. In another example, the operator associated with the games may be provided data elements or control commands to selectively organize at least some of the active games within or irrespective of the comparison. In such an example, the operator may value tables with a full set of participants, and therefore applies tiebreaker logic to the game-logic circuitry that organizes games near full player capacity first over tables with less players on the multi-game management interface. In some embodiments, the operator-based organization criteria may be applied to the list of active games by default until a search tool is selected by the player.

In some embodiments, the comparison at step 208 is performed once at the time of player selection. In other embodiments, new game data is collected following the initial comparison, and therefore the steps 208 and 210 are repeated while the multi-game management interface is actively presented. In further embodiments, the steps 208 and 210 are repeated each time the player enters the multi-game management interface. The selected search tool may persist for a predefined period, until a termination condition is detected, and/or the player deselecting the search tool. The termination condition may include, for example, the player leaving the multi-game management interface. Deselecting the search tool may include selection of another search, where the previously selected tool is automatically removed. In certain embodiments, multiple search tools may be selected and applied at once. For example, a sort search tool and a filter search tool may be used together.

In the example embodiment, the active games are selectively added to the participating games slots by the player. Once an active game is added, the player is entered as a participant within the added game and the player participates via a multi-game interface corresponding to the multi-game management interface. The updated presentation from steps 208 and 210 enable the player to organize the presentation of the active games to their preference and streamline the detection and selection of desired games. To add an active game to a participating game slot, the player provides player input via one or more input devices. In one example in which the management interface is presented on a touchscreen, the player selects and drags the presentation element of a first active game over to the presentation element of a first participating game slot. Other suitable input and/or presentation of the player input adding the active games to participating game slots are considered within the spirit and scope of the present disclosure. For example, the presentation elements of the participating game slots may be dragged over to the active games, or the active games within participating game slots may be visually denoted through modified presentation elements (e.g., different colors, text, etc.) that distinguish these games from unselected games.

At step 212, in response to detecting the player input adding a first active game to a first participating game slot, the presentation assembly visually links the presentation element of the first game to the first participating game slot. The visual link may combine or otherwise associate the presentation element of the first game with the presentation element of the first participating game or alter the presentation element of the first game to denote the association with the first participating game slot as described above. The visual changes further enable the player to track the multi-game gaming session and dynamically adjust the games within the participating game slots as described herein.

In response to the step 212, the player can participate within the first game. At step 214, the presentation assembly presents the first game on the multi-game interface for player participation. At the multi-game interface, the input devices enable the player to perform player actions (e.g., bet, fold, draw, etc.) while the presentation assembly presents game outcomes and other game events.

In at least some embodiments, the player may also selectively fill other available participating game slots to participate in a plurality of games concurrently. The addition of other active games may be according to the same active games list organization or by another organization (i.e., a new search tool is selected, or the selected tool is deselected). The number of participating game slots is calibrated to facilitate play of concurrent games without overloading the underlying resources of the gaming system. Overloading the system resources may cause the game performance, interface navigation, and other functions of the gaming system to experience slow down and potentially crashes, thereby creating undesirable user experiences. The number of participating game slots may be predetermined (e.g., four) or dynamically adjusted based on game type and/or the presence or absence of other multi-game instances active on the gaming machine.

In the example embodiment, given the limitation to the number of participating game slots, the gaming system is configured to enable the player to selectively remove and/or swap active games from the slots. More specifically, in this example, the player provides player input to remove the first game from the first participating game slot. The player input may be provided within the multi-game management interface and/or the multi-game interface. At step 216, in response to detecting the player input removing the first game, the presentation assembly is configured to remove the first game from the multi-game interface and visually unlink the presentation elements of the first game and the first participating game slot. In one example with a touchscreen, the player drags and drops the presentation element of the first game away from the first participating game slot to indicate the removal of the first game. In this example, the first game is removed from the multi-game interface (following any pending game resolutions), the presentation element of the first participating game slot is updated to be "empty," and the first game is returned to the list of active games for subsequent selection. Other suitable forms of player input and visual updates consistent with the configuration of the gaming system and the interfaces are contemplated within the present disclosure. In certain embodiments, step 216 may be combined with the addition of another active game (i.e., steps 212 and 214), where player input adding the new active game in the first participating game slot automatically removes the first game.

In some embodiments, the gaming system is configured to automate or schedule at least some of the steps of the method 200 to streamline the gaming session for the players. In one example, the multi-game management interface includes an auto add tool that automatically fills empty participating game slots with active games. The automatic add tools may pick games randomly, from the beginning of the active games list, or incorporate a search tool such that the top games based on the comparison within the search tool are automatically added. In certain embodiments, the automatic add tools also swap any games within the participating game slots with new games. In another example, the multi-game management interface includes notifications, where the player may specify a notification for a particular game or any games that match criteria specified by the player. The notification may be presentable within the multi-game interface or other interfaces to enable the player to automatically add the games associated with the notification or return to the multi-game management interface to adjust the games accordingly.

FIGS. 5A-5D depict an example multi-game management interface 300 presented by a presentation assembly of a gaming system (e.g., the system 100, shown in FIG. 3). The interface 300 includes a plurality of presentation elements to provide the functions of the gaming system as described herein. In the example embodiment, the interface 300 is configured for use with a touchscreen such that player input is provided by the player manipulating the presentation elements. In other embodiments, the interface 300 includes additional, fewer, or alternative presentation elements in the same or different configurations relative to the illustrated embodiment, including those elements and configurations described elsewhere herein. For example, at least some presentation elements are hidden from the interface 300 for functionality outside of the present invention, such as elements to call an attendant, help buttons, and the like.

Figure 5A:
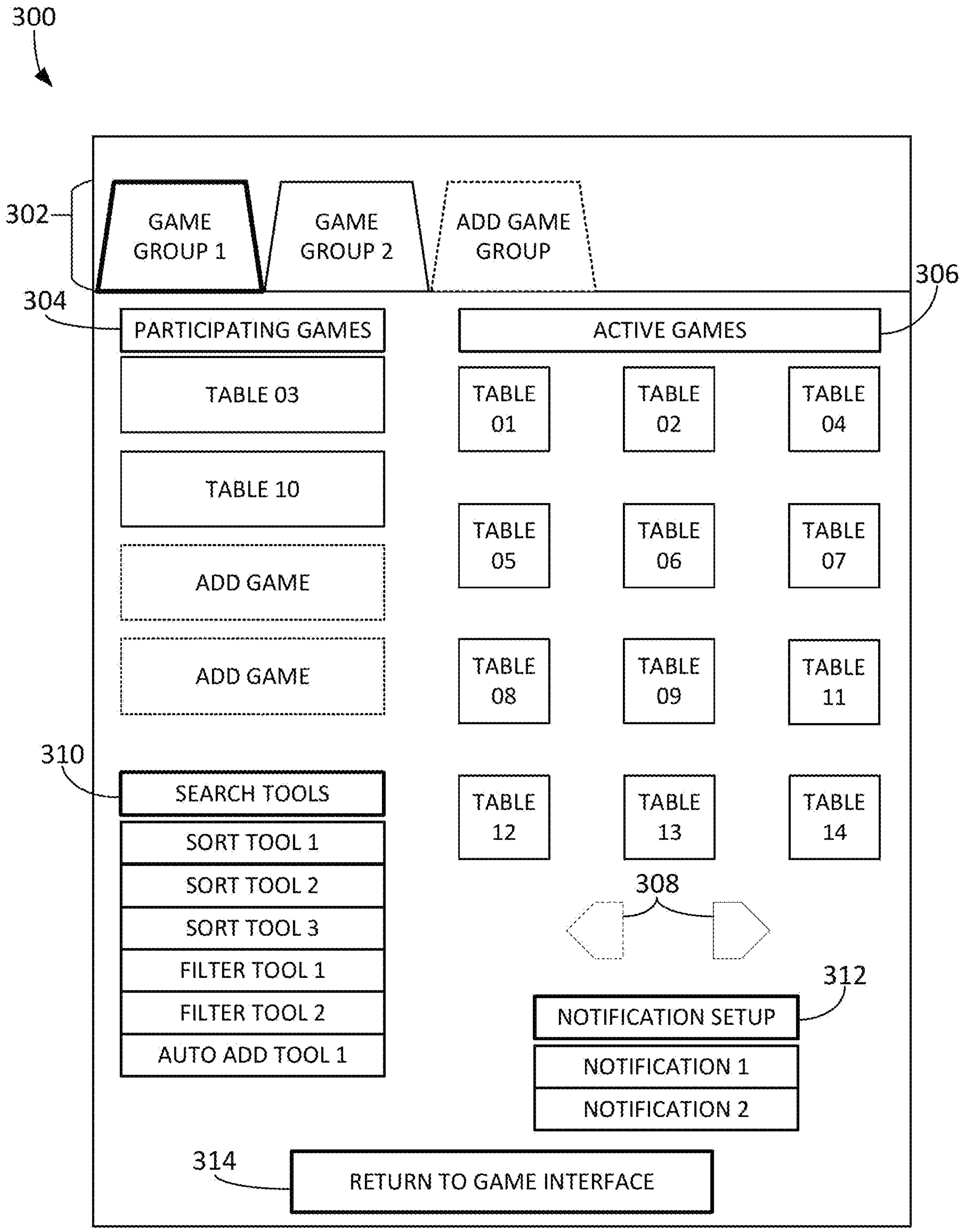
FIG. 5A is an example multi-game management interface in a first state, according to an embodiment of the present invention.

FIG. 5A depicts the interface 300 in a first state, which may be a default state of the interface 300. In the example embodiment, the interface 300 includes presentation elements for game groups 302, participating game slots 304, active games 306, navigation tools 308, search tools 310, notifications 312, and game interface navigation 314.

The game group presentation elements 302 depict different concurrent game groups the player is participating in at a given time. A game group in the example embodiment is associated with one game type and includes a number of game slots. That is, each game group includes a corresponding multi-game interface and multi-game management interface. In other embodiments, a game group may include games across multiple game types. The game group presentation elements 302 may persist within both multi-game interfaces and multi-game management interfaces to enable the player to quickly swap to a different game group. In the illustrated embodiment, "GAME GROUP 1" is associated with the interface 300 as depicted through the bold border around the corresponding presentation element 302 while "GAME GROUP 2" is active but not currently presented. In certain embodiments, the "GAME GROUP 2" is presented on a different display device and/or via a reduced presentation (e.g., within the presentation element 302 of the "GAME GROUP 2," where game outcomes, wager outcomes, and the like may be presented in a limited manner).

In addition to the two active game groups, the presentation elements 302 include a "ADD GAME GROUP" element that, when selected by the player, creates a new game group and prompts the player to initially configure the game group. For example, the player may be prompted to select a game type for the new game group and/or one or more initial games to participate in. To remove a game group, the interface 300 may include additional presentation elements that enable the remove of a game group, including game groups other than the current active game group. Removing a game group causes the player to be removed as a participant from any games within the removed game group. In the example embodiment, the number of concurrent game groups is limited to a predefined number of groups to prevent excessive resource burden from the concurrent games. In one example, the number of game groups is limited to four. In another example, the number of game groups is limited to one.

The presentation elements of the participating game slots 304 (listed below the "PARTICIPATING GAMES" element)

indicate the games the player is an active participant in. In the illustrated embodiment, the games are indicated "tables" for a table-based game like baccarat. That is, "TABLE 03" and "TABLE 10" occupy two of the four participating game slots 304. The remaining two participating game slots 304 are empty awaiting games as indicated by the "ADD GAME" indicia. It is to be understood that the indicia, borders, or other visual modifiers presented in FIGS. 5A-5D are for exemplary purposes only and are not intended to limit the present disclosure to the illustrated embodiments.

The active games 306 are presented in a list format on the interface 300. The active games may be presented in rows, columns, and/or any other suitable configuration on the interface 300. In at least some embodiments, in addition to indicia identifying each game, the active games presentation includes at least a portion of the collected game data from the corresponding game. For example, the presentation elements of the active games 306 may present the latest game outcome, historical game trends, minimum and maximum wager amounts, and/or number of participants. Other suitable data and/or graphical elements (including animated elements) may be presented for the active games, such as notifications of any friends participating in a game.

In the illustrated embodiment, the active games 306 are organized in numerical order, and the active games in the participating game slots 304 are removed from the list. In other embodiments, other suitable default organization configurations of the active games 306 may be used, including configurations in which the games in the participating game slots 304 are still in the list of active games 306. In such configurations, the games in the participating game slots 304 may be visually distinguishable from other active games 306. In the example embodiment, the number of active games 306 exceeds the space on the interface 300 for active games 306 to be shown. That is, a portion of the active games 306 are hidden from view at a given time. The interface 300 includes navigation tools 308 to indicate the presence of hidden active games 306 and to prompt the player for player input to see the hidden games 306. The navigation tools in the illustrated embodiment are configured for page-based navigation, where subsets of active games 306 are presented as separate "pages" and the navigation tools 308 swaps between presented pages. The navigation tools 308 may include indicia to indicate to the player the number of pages and/or the current page. In other embodiments, other suitable navigation schemes may be used, such as a continuous scrolling navigation scheme, a page-based scheme with alternative navigation tools 308, and the like. In certain embodiments, the number of presented active games 306 on the interface 300 may be adjustable automatically or in response to player input. In such embodiments, the presentation of each active game 306 changes based on the number of concurrently presented active games 306 (e.g., as the number of presented games 306 increases, the presented game data for each game 306 is reduced or completely hidden).

Beyond navigating the active games 306 via the navigation tools 308, the interface 300 is configured to enable the player to organize the active games 306 according to predefined criteria to reduce the need to navigate the list of games 306 to discover desirable games according to the preferences of the player. More specifically, the interface 300 includes the search tools 310 to organize the list of active games 306 based on corresponding predetermined search criteria. In the illustrated embodiment, the search tools 310 includes sort tools, filter tools, and automatic add tools. In other embodiments, additional or alternative search tools that function to alter the list of active games are used. The sort tools organize the active games 306 according to an ascending or descending order based on a comparison with each other and/or a predefined value. The filter tools compare the active games 306 to a threshold value or predefined data element and hide, remove, or otherwise deprioritize games 306 that fail to meet the comparison conditions. The automatic add tool combines a sort and/or filter tool with an automated process to add active games 306 to at least the empty participating game slots 304. Some automatic add tools may replace existing games in the slots 304, and certain automatic add tools may not include sort or filter functions, but rather just automatically add games 306 to the slots 304. For such tools, the automatic addition may be at least partially random, based on the state of the list of active games 306, and/or other suitable conditions.

In the example embodiment, the search tools 310 are organized in a list format with text-based indicia. In other embodiments, the search tools 310 are presented in a different configuration. In certain embodiments, the search tools 310 may not be presented on the interface 300, but rather are presented or otherwise indicated elsewhere from the gaming machine. For example, the available search tools 310 may be presented on a secondary display device, or the tools 310 may have dedicated input devices (e.g., buttons) that, when player input is received, applies the selected search tool 310.

In the example embodiment, the interface 300 is configured to facilitate delayed and/or automated addition of games using a notification scheme. The notification tools 312 are configured to enable the player to setup a notification having predefined criteria (that the player may set or the notification automatically includes). The active games 306 are compared to the predefined criteria of the notification similar to the search tools 310. If the game-logic circuitry detects one or more active games 306 that meet the predefined criteria, a notification is presented on the active presentation of the gaming machine. The notification may include one or more action shortcuts that the player may select to address the games 306 associated with the notification. In one example, the action shortcuts include a shortcut to automatically add the games 306 associated with the notification to the participating game slots 304, which may include removing other games from the slots 304. In another example, the action shortcuts include a shortcut to navigate the player to the interface 300 to manually configure the slots 304. In such an example, the list of active games may be organized to highlight, filter, or sort the games 306 associated with the notification to streamline the configuration process for the player.

In the example embodiment, the interface 300 includes the game interface navigation element 314 enables the player to swap between the multi-game management interface 300 and a corresponding multi-game interface to participate in the games within the participating game slots 304. In some embodiments, the interface 300 does not include the element 314, but rather an input device is configured to swap between interfaces. In other embodiments, the element 314 may be functionally incorporated into other presentation elements. For example, the "GAME GROUP 1" element 302 may be selected by the player to swap between the interfaces associated with Game Group 1. In certain embodiments, the game interface navigation element 314 includes additional functions. For example, the element 314 may be configured to present outcomes, events, and the like from the ongoing games in the slots 304 while the player is within the interface 300. In another example, the element 314 may be divided into sub-elements that bring the player to a particular configuration of the multi-game interface (e.g., all games presented, focus on one game, etc.).

Figure 5B:
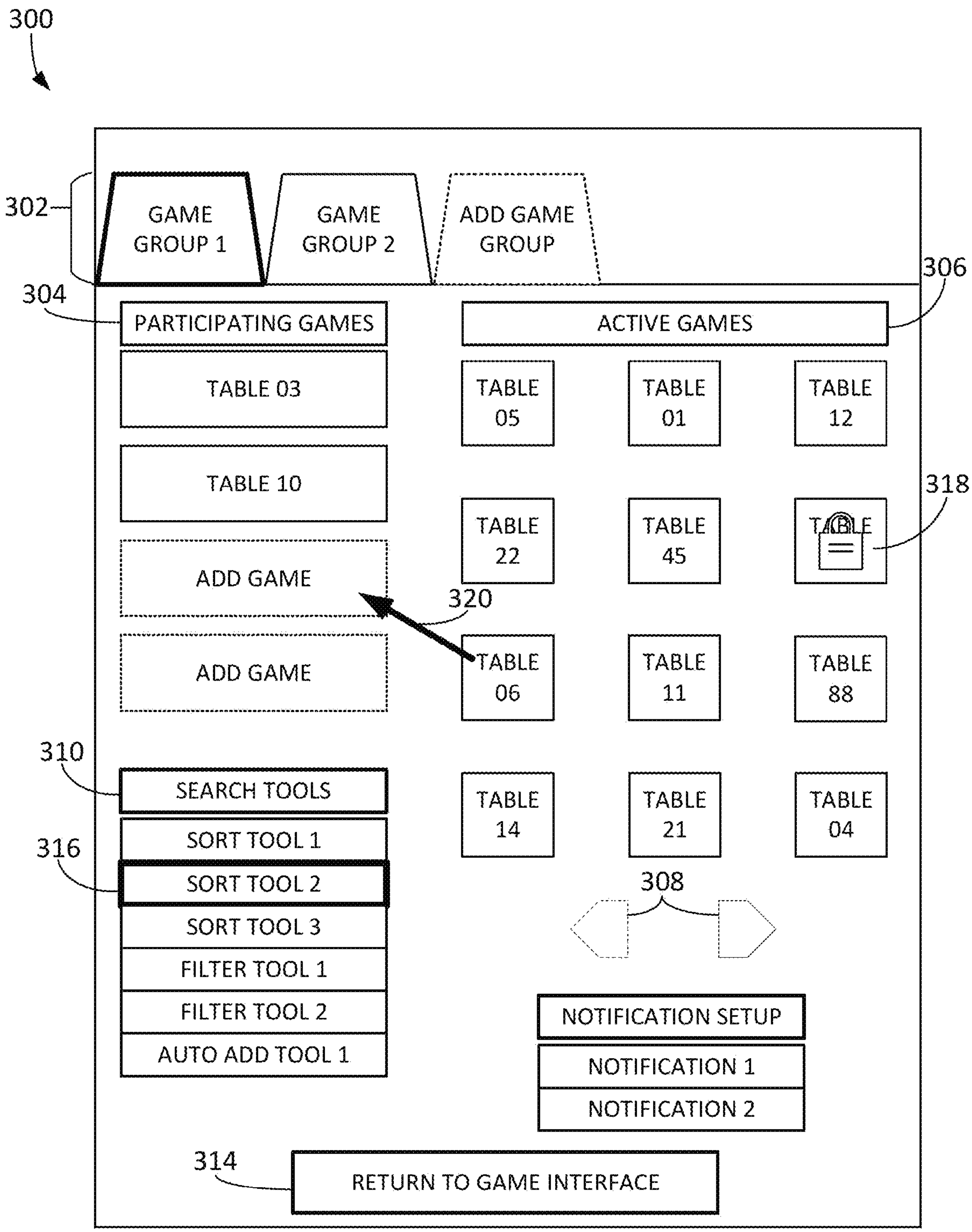
FIG. 5B is the multi-game management interface shown in FIG. 5A in a second state, according to an embodiment of the present invention.

FIG. 5B depicts the interface 300 in a second state. In the second state, the player has selected a search tool 316 to organize the active games. The search tool 316 is a sort tool, and the presentation assembly has updated the interface 300 to organize the active games 306 based on the search criteria of the search tool 316. In one example, the search tool 316 causes the active games 306 to be sorted based on the frequency or absence of a particular game trend (e.g., for baccarat, a number of runs or a number of ping-pong outcomes, where runs indicate consecutive player wins and ping-pong outcomes indicate alternating player and dealer wins). The active games 306 have been sorted in the second state based on the player selection of the search tool 316.

Within the active games 306 presented on the interface 300, a locked game 318 is presented. In the illustrated embodiment, the locked game 318 is depicted with a 'lock' graphical element within the presentation element of the game 318. In other embodiments, other suitable presentations may be used to depict locked games 318 and/or other aspects of certain active games 318. For example, a big win or large win streak may be indicated through flames or other graphical modifiers applied to the presentation element of the corresponding active game 306.

A locked game 318 is a game in which the player cannot add to the participating game slots 304, either because the player is already a participant within the game 318 or new players cannot be added to the game 318 at a given time. If the player is already a participant in the illustrated embodiment, the game 318 is already within a participating game slot 304 in Game Group 1 or Game Group 2 if the Game Group 2 is configured for the same game or games as Game Group 1. In certain embodiments, adding the locked game 318 to the slots 304 of Game Group 1 removes the locked game 318 from the slots 304 of Game Group 2. If the player is not a participant within the locked game 318, the gaming system may provide the player the ability to set a notification within the interface 300 to notify the player when the locked game 318 is available. In some embodiments, the locked game 318 and any other locked games may be hidden from the interface, sorted with lower priority than available games 306 (irrespective of the search criteria in some embodiments), or otherwise organized different from the available games 306.

In the example embodiment, the player provides player input adding the "TABLE 06" game 306 to one of the participating game slots 304. More specifically, the player selects the game 306, drags, and then drops the game 306 on an empty participating game slot 304 (indicated by arrow 320) via the touchscreen presenting the interface 300. Other suitable forms of player input may be used. For example, the player may drag and drop the presentation element of Table 06 elsewhere within the presentation elements associated with the participating game slots 304. In another example, double-tapping the Table 06 presentation element automatically adds Table 06 to a game slot 304.

Figure 5C:
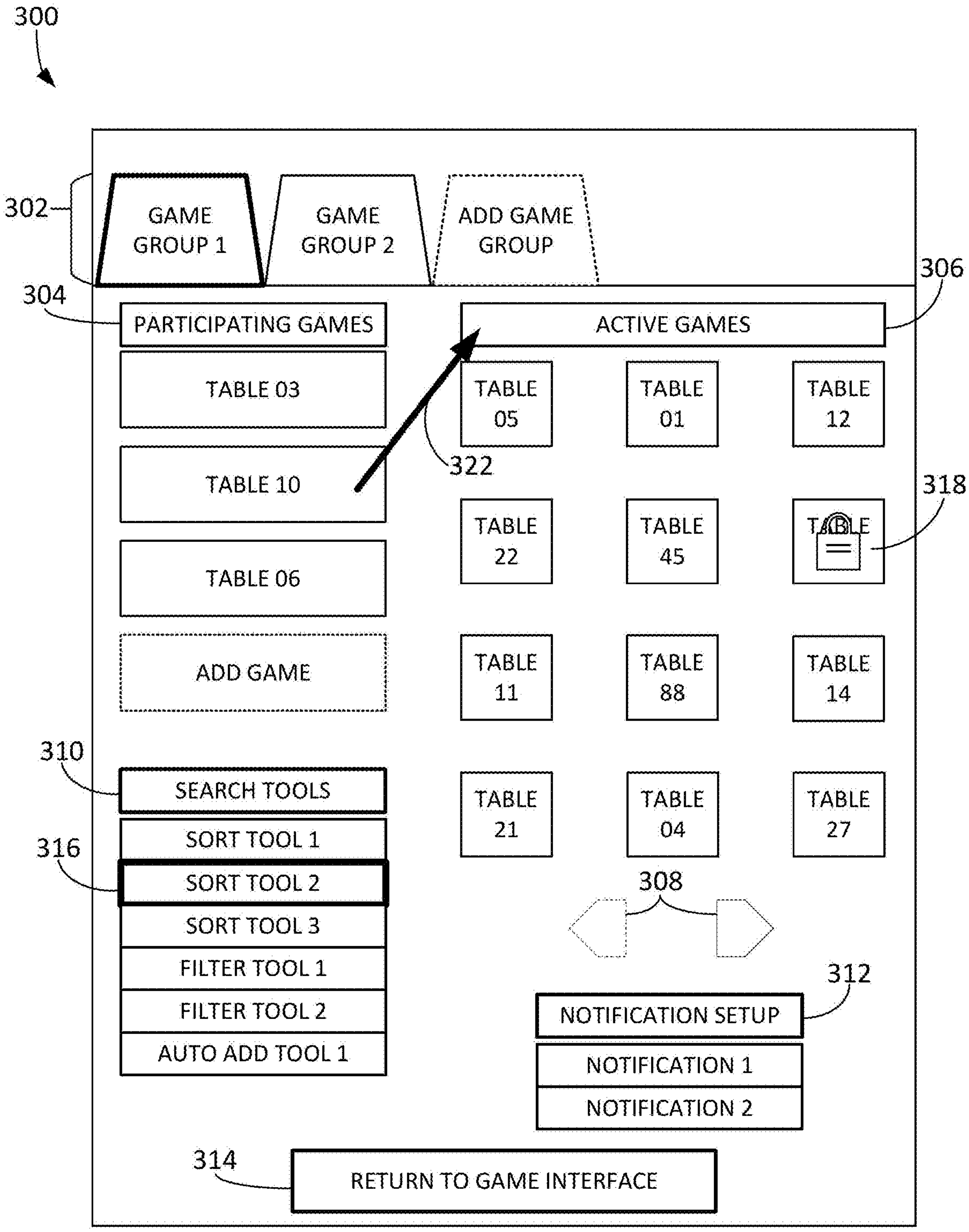
FIG. 5C is the multi-game management interface shown in FIG. 5A in a third state, according to an embodiment of the present invention.

FIG. 5C depicts the game interface 300 in a third state following the second state. In the third state, Table 06 has been added to a participating game slot 304. In the illustrated embodiment, the presentation element of Table 06 has been removed from the list of active games 306, and the remaining active games 306 have been updated to occupy the position on the interface 300 left by Table 06. That is, in comparing FIGS. 5B and 5C, the presentation elements of the games 306 to the right and upwards to fill the empty position, and the presentation element of Table 27 is added to the interface 300. In certain embodiments, the Table 06 presentation element may remain in the list of active games 306. In such embodiments, the presentation element of Table 06 is updated to be a visually presented as a locked game and/or is sorted with a lower priority within the list of active games 306.

In the third state, the player provides player input to remove Table 10 from the participating games slots 304 and, by extension, conclude participation in the Table 10 game. In the example embodiment, the player selects the presentation element of Table 10 in one of the game slots 304 and drags the element over to the list of active games 306 as indicated by arrow 322. In response to dropping or releasing the presentation element, Table 10 is removed from the game slot 304, the player is removed from the corresponding game, and the multi-game interface associated with the interface 300 is updated to remove the Table 10 game. Additionally or alternatively, other suitable player input may be used to remove games from the participating game slots 304. For example, double-tapping, swiping, and other similar gestures to the Table 10 presentation element may be detected to indicate the removal of the Table 10 game.

Figure 5D:
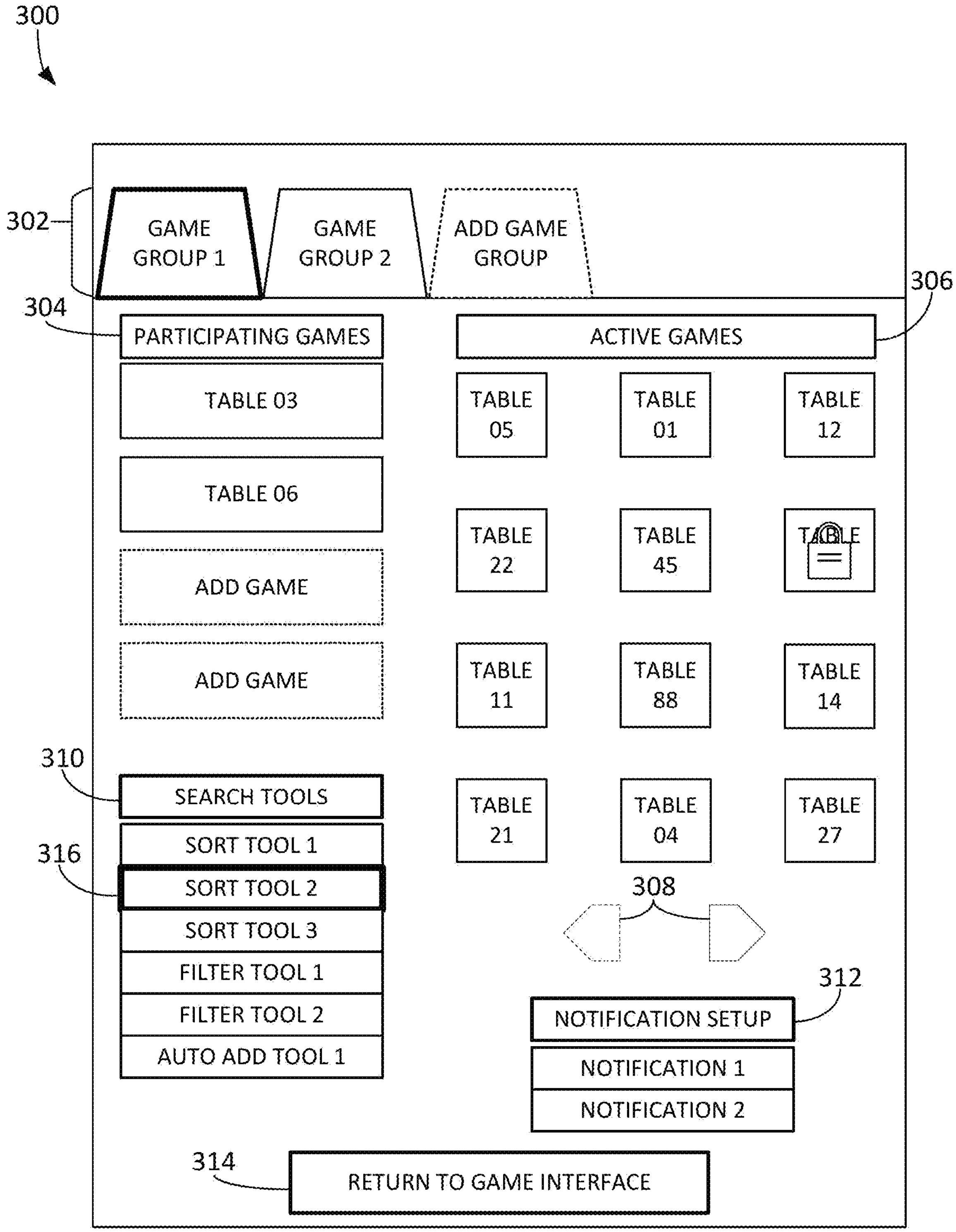
FIG. 5D is the multi-game management interface shown in FIG. 5A in a fourth state, according to an embodiment of the present invention.

FIG. 5D depicts the interface 300 in a fourth state following the third state. In the fourth state, the interface 300 has been updated to remove the Table 10 game from the participating game slots 304. Table 06 has been visually moved upward within the game slots 304 in the example embodiment such that empty game slots 304 appear below occupied game slots 304. In other embodiments, the presentation element of Table 06 remains in the same position after the removal of Table 10.

The presentation element of Table 10 is returned to the list of active games 306, though Table 10 is not visible on the interface 300 in the fourth state due to the organization associated with the search tool 316. That is, based on the search criteria of the search tool 316, the Table 10 is sorted outside of view on the interface 300 in the fourth state (though Table 10 is viewable through the use of the navigation tools 308).

Figure 6A:
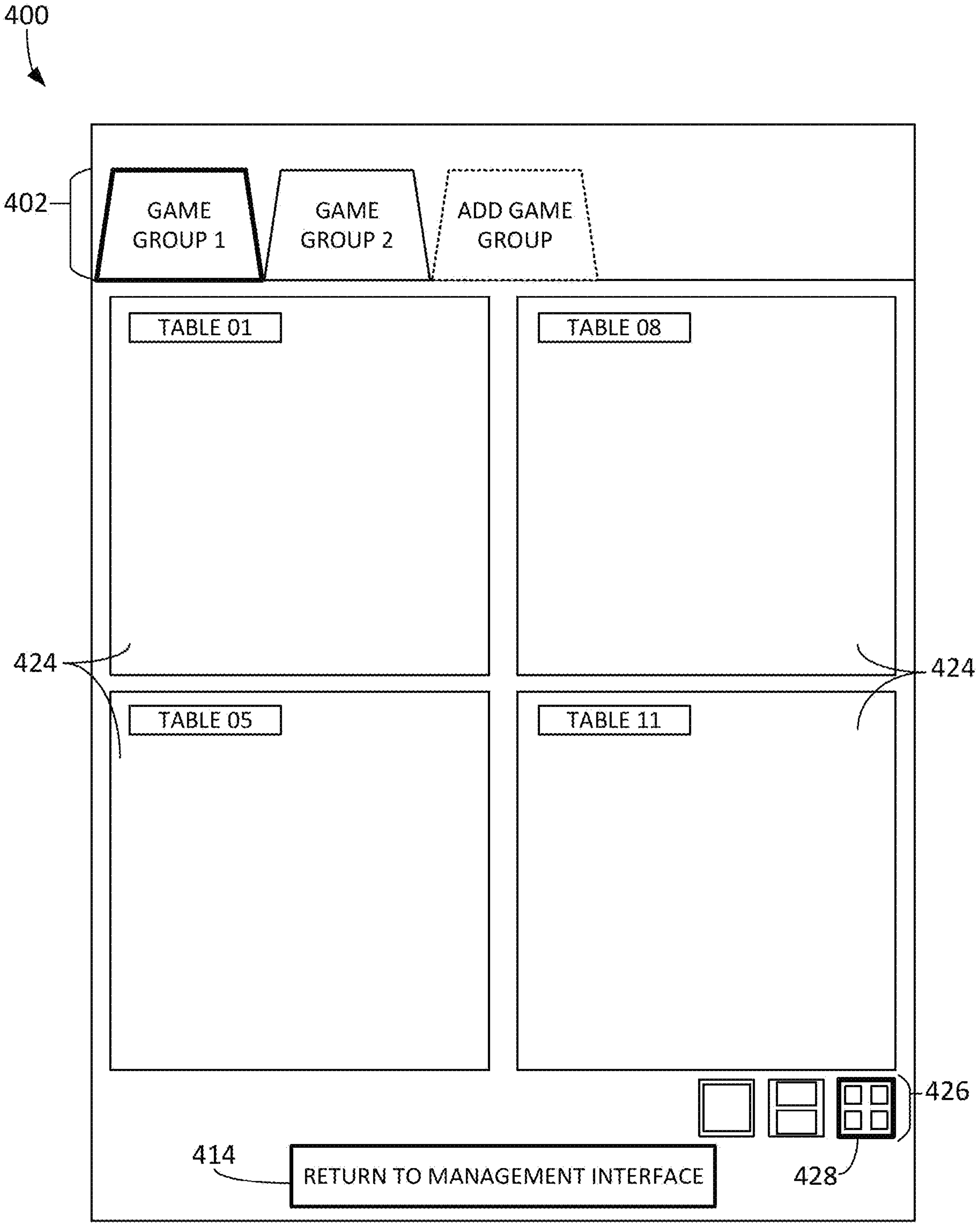
FIG. 6A is an example multi-game interface in a first state, according to an embodiment of the present invention.
Figure 6B:
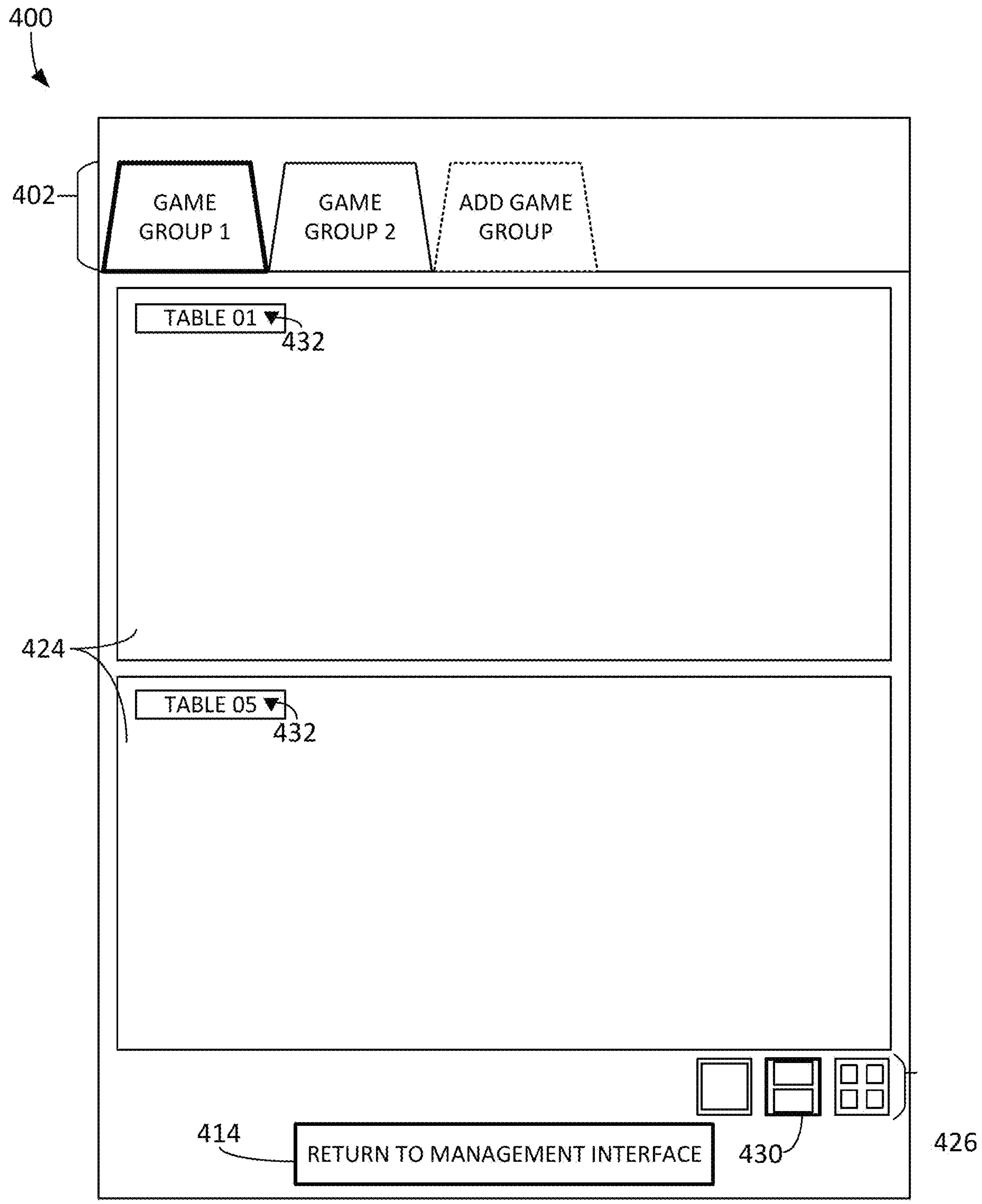
FIG. 6B is the example interface shown in FIG. 6A in a second state, according to an embodiment of the present invention.
Figure 6C:
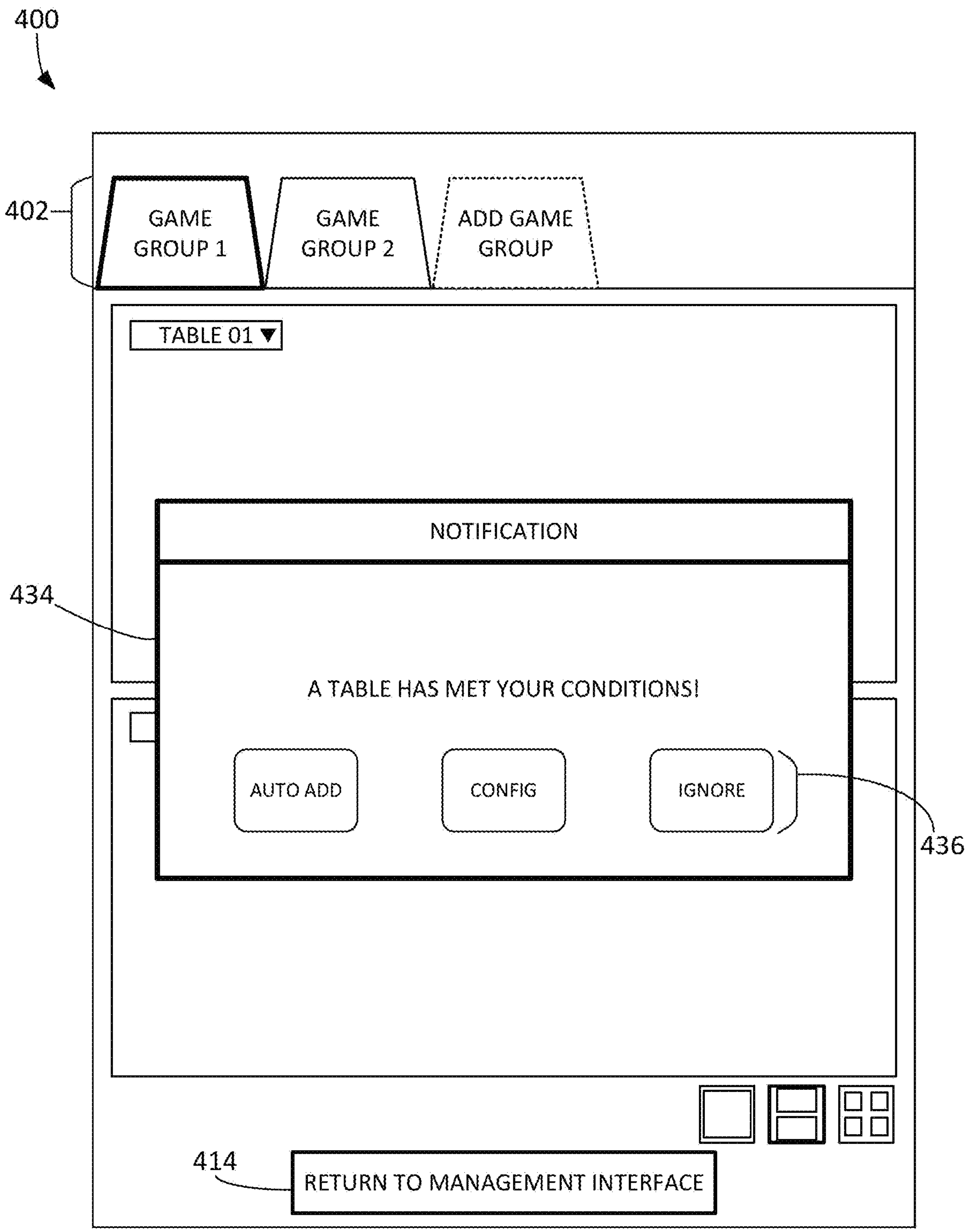
FIG. 6C is the example interface shown in FIG. 6C in a third state, according to an embodiment of the present invention.

FIGS. 6A-6C depict an example multi-game interface 400 presented by a presentation assembly of a gaming system (e.g., the system 100 shown in FIG. 3). More specifically, FIGS. 6A-6C depict the interface 400 in first, second, and third states, respectively. The multi-game interface 400 may be paired with a multi-game management interface, such as the interface 300 shown in FIGS. 5A-5D. Although several presentation elements are presented within the illustrated embodiment, it is to be understood that the interface 400 may include additional, fewer, or alternative presentation elements in one or more configurations, including those elements and/or configurations described herein.

In the example embodiment, with respect to FIG. 6A, the interface 400 includes game group presentation elements 402 similar to the elements 302 shown in FIGS. 5A-5D. In at least some embodiments, the game group elements 402 appear to be the same or static when switching between the interface 400 and a corresponding multi-game management interface. In certain embodiments, the game group elements 402 may be presented differently from the game group elements of the multi-game management interface.

In the illustrated embodiment, the interface 400 is configured to present four game windows 424. Each game window 424 corresponds to a particular game within a participating game slot. The game windows 424 present game events, game outcomes, and other suitable information, inputs, and the like associated with the corresponding games. In some embodiments, player input is provided within the game window 424 for each game. In other embodiments, player inputs (particularly player input types common between the games, such as wagers) are presented separately from the game windows 424 such that the player can provide input to any of the game windows 424. For configurations with multiple windows 424 present, the player may select a game window 424 to be associated with player input and/or the game-logic circuitry of the gaming system may automatically apply the player input to a corresponding game based on the state of each game window 424. For example, if only one game is awaiting player input, the game-logic circuitry may automatically apply any received player input to the game. In certain embodiments, the player input is provided in a manner that also indicates which game window 424 is associated with the input. For example, the player may drag and drop tokens or chips to a particular game window 424 to place a wager in the corresponding game.

In the example embodiment, the interface 400 is configurable into a plurality of views or configurations. For example, the game windows 424 are divided into quadrants, and the player may provide input (via the interface 400 and/or a corresponding management interface) to organize the games to their preference. In another example, the interface 400 is configurable to present one active game through the maximum number of games allotted by the participating game slots via one or more predefined and/or custom configurations. In the example embodiment, the interface 400 is configured to present game windows 424 in three predefined configurations: a quadrant view with four games, a split screen view with two games, and a single game view.

The interface 400 includes a plurality of view navigation tools 426 that the player can select to swap between view configurations. In the illustrated embodiment in FIG. 6A, the quadrant view element 428 is selected as indicated by the bold border and the layout of the game windows 424. In certain embodiments, the view navigation tools 426 may include custom interface layouts that the player defines through commands and inputs available through the interface 400 and/or another interface associated with the gaming system (e.g., within an application that is associated with the gaming system and is installed on a personal device of the player). In other embodiments, other suitable controls and/or presentation of said controls may be provided for altering the view of the interface 400, including controls both within and outside of the interface 400.

In the example embodiment, the interface 400 includes a game-interface navigation element 414 similar to the element 314 shown in FIGS. 5A-5D. The element 414 is configured to receive player input that swaps the interface 400 for a corresponding multi-game management interface. In other embodiments, the navigation element 414 is presented differently from the corresponding navigation element of the multi-game management interface. For example, the navigation element 414 may be presented similar to the view navigation tools 426.

FIG. 6B depicts the interface 400 in a second state. In the second state, the configuration of the game windows 424 has been changed. More specifically, a split screen view element 430 of the view navigation tools 426 has been selected, and the game windows 424 have been updated to be presented in a split screen manner. As a result of the number of presented game windows 424 being less than the number of games in participating game slots (e.g., four), the game windows 424 include game navigation tools 432 to swap between games within the game windows 424. In the illustrated example, selecting the presentation element of the tool 432 causes a drop-down menu to be presented with a list of the games within participating game slots, where further selection causes the selected game to be presented in the corresponding window 424. In other embodiments, other suitable game navigation tools 432 (and presentations thereof) may be provided within the interface 400, including tools 432 that are presented external to the game windows 424.

In certain embodiments, the number of game windows 424 may be predefined between view navigation tools 426, but multiple configurations of the windows 424 and/or the games may be available for player selection. For example, the split screen view in FIG. 6B is shown in a vertical stacked configuration, and the interface 400 may be configured to present the windows 424 in a column-based configuration. In another example, the quadrant view in FIG. 6A may be customizable to swap between the equal quadrants as illustrated and one or more configurations that focus on a particular game window 424 within the configuration (i.e., a primary game window and secondary game windows). The primary game window may have an enhanced size and information relative to the secondary game windows. These various configurations may be accessed, for example and without limitation, through dedicated view navigation tools 426, providing alternative inputs to existing tools 426, and/or other suitable means of customizing the view on the interface 400.

FIG. 6C depicts the interface 400 in a third state in which a notification has been triggered. That is, the player and/or the gaming system has established a notification for one or more games meeting predefined notification criteria (e.g., a particular game trend). The notification may be activated, for example, via notification tools presented within a multi-game management interface (which may correspond to the interface 400 or another multi-game interface of the gaming system.

In the example embodiment, the notification is presented within the interface 400 using a notification window 434 overlapping a portion of the game windows 424. In other embodiments, the notification is presented within the interface 400 via other suitable configurations and/or is presentable within other interfaces, including multi-game management interfaces and/or interfaces on display devices other than the display device presenting the interface 400.

The notification window 434 is presented in a configuration for indicating to the player the contents of the notification, such as the criteria associated with the notification, the number of games associated with the notification, and/or the identifiers of the games. In the notification window 434, several player selectable options 436 are provided. Selecting one of the options 436 causes the game-logic circuitry to perform one or more automated tasks. In the illustrated example, the "AUTO ADD" option causes the one or more games associated with the notification to be automatically added to participating game slots. If the number of empty slots is less than the number of games associated with the notification, an additional window or prompt may be provided to select a subset of the games to add, remove other existing games from the slots, and/or open a new game group to add any overflow games to new participating game slots. The "CONFIG" option causes the corresponding multi-game management interface to be automatically opened. In certain embodiments, the list of active games may be filtered, sorted, and/or otherwise organized to highlight the games associated with the notification to enable the player to configure the participating game slots manually.

The "IGNORE" option causes the notification window 434 to be hidden or otherwise removed from view. Selection of this option may remove the active notification, or the notification may remain active for subsequent detection of the notification criteria being met. Additional, fewer, or alternative options 436 may be provided within the window 434 in other embodiments.

Figure 7A:
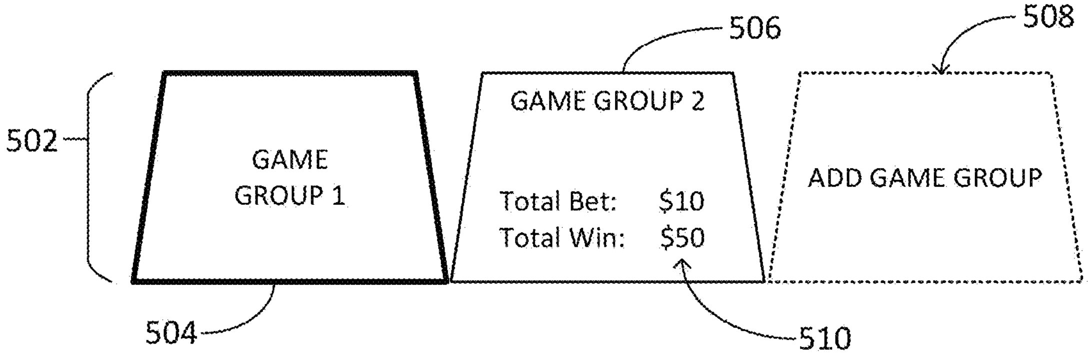
FIG. 7A is an example set of game tabs including meter indicia, according to an embodiment of the present invention.
Figure 7B:
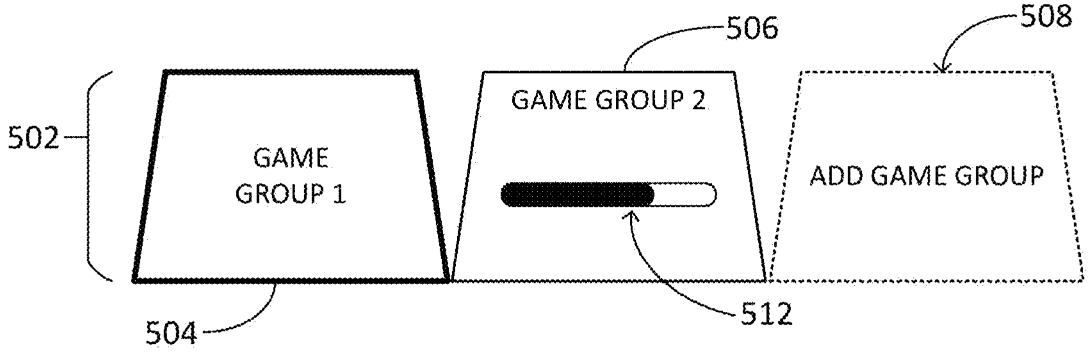
FIG. 7B is an example set of game tabs including a game progress meter, according to an embodiment of the present invention.
Figure 7C:
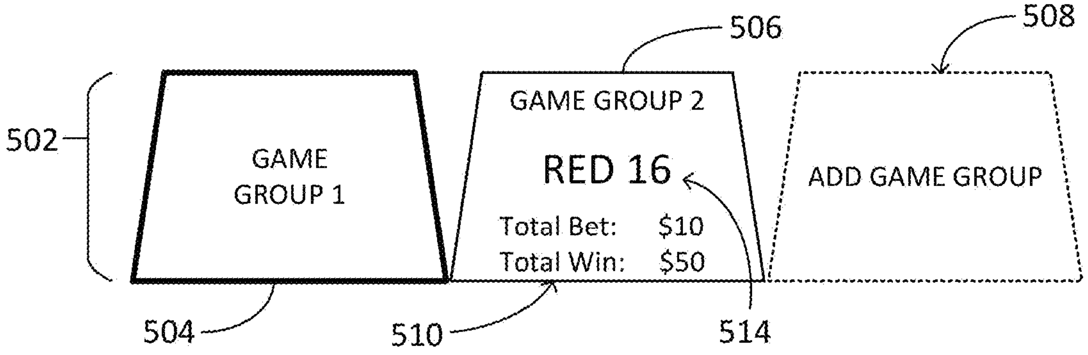
FIG. 7C is an example set of game tabs including outcome indicia, according to an embodiment of the present invention.

In some embodiments, the presentation of the gaming system is configured to enhance the ability of the player to participate in multiple games concurrently. In one example, the presentation of the multi-game gaming session is configured to provide information from games that are not shown or focused on within the interface. These games may be referred to herein as "hidden games," "secondary games," "unfocused games," and the like (while games presented in focus within the interface may adopt opposing terms). One or more of the interfaces may be configured to display a limited presentation for the hidden games to notify the player of particular events occurring within the hidden games. FIGS. 7A-7C depict an example of the hidden game presentation. More specifically, FIGS. 7A-7C depict a set of game group tabs 502 configured to present information regarding one or more hidden games within an interface of a gaming system (e.g., the system 100, shown in FIG. 3). The tabs 502 include a primary tab 504, a secondary tab 504, and an add game tab 506.

The primary tab 504 is associated with the game or games primarily presented by the interface (including a multi-game management interface), while the secondary tab 506 is associated with one or more hidden or unfocused games. For example, the primary tab 504 may be associated with baccarat games, whereas the secondary tab 506 is associated with roulette or sic bo games. The add game tab 508 indicates to the player that additional slots are available for the player to participate within and, in embodiments in which the player provided input associated with the presentation, is selectable to open a new game group.

With respect to FIG. 7A, the secondary tab 506 includes meter indicia 510. The meter indicia 510 indicates to the player changes to the credit balance of the player in response to game events and outcomes of the games within the secondary tab 506. In the illustrated embodiment, the indicia 510 depicts this information as aggregated totals between all of the games in the secondary tab. In other embodiments, the indicia 510 may be updated separately for each game associated with the secondary tab 506. In the example embodiment, the indicia 510 is presented in response to the player switching to another tab 502 from the secondary tab 506 (e.g., the primary tab 504) and/or an initial outcome or credit change is detected after switching from the secondary tab 506. The indicia 510 may be configured to remain for a period of time that may be extended in response to new credit-changing events. In other embodiments, the indicia 510 persists at least until the player switches back to the secondary tab 506 to participate within the games of the tab 506 again.

FIG. 7B depicts the secondary tab 506 with a game progress meter 512. The game progress meter 512 visually indicates to the player that one or more game outcomes are being revealed and/or that a pending action is available for the player (e.g., bet, fold, draw, spin, etc. according to the different game types). The meter 512 is presented as a bar that is animated to fill or empty over time in the illustrated embodiment. In other embodiments, the meter 512 may be presented and/or animated in other suitable configurations and/or the information presented by the meter 512 may be presented by additional or alternative presentation elements, such as indicia corresponding to the meter 512.

FIG. 7C depicts the secondary tab 506 with the meter indicia 510 and outcome indicia 514. The outcome indicia 514 indicates the outcome of one or more games. In the illustrated embodiment, the secondary tab 506 is associated with roulette games, the outcome indicia 514 of "RED 16" indicates the outcome of one of the roulette games within a slot of the secondary tab 506. In some embodiments, the indicia 514 may include or be accompanied by one or more graphical elements and/or animations for presenting the game outcome, such as a roulette ball landing in the corresponding pocket or playing cards being drawn and revealed.

It is to be understood that the presentations shown in FIGS. 7A-7C are for exemplary purposes only and are not intended to limit the information presented to the illustrated configurations. Other suitable configurations, including other information or controls described elsewhere herein, may be presented within an interface of the gaming system. In one example, the presentation is not limited to a secondary tab, but rather may also include games hidden from view within the primary tab. That is, in the illustrated embodiments, the primary tab 504 may also be configured to present information similar to the secondary tab 506 for games not currently shown. In another example, the information is not presented within the tabs 502, but rather is presented within another area of the interface and/or on another interface of the gaming system. In a further example, the secondary tab 506 includes selectable commands to participate within one or more hidden games without swapping the interface. That is, the secondary tab 506 may present selectable options to perform player actions within a hidden game, such as wager, fold, spin, and the like.

FIGS. 8-13 depict a plurality of example game interfaces for a gaming system (e.g., the system 100, shown in FIG. 3). The game interfaces are associated with a multi-game gaming session. In the example embodiment, the game interfaces are configured for touchscreen use. That is, the presentation elements are configured to prompt the player for direct input like selecting, dragging and dropping, swiping, and other touch-based inputs. In other embodiments, the player may provide additional or alternative forms of input, and the interfaces may be adapted to reflect these forms of input.

Figure 8:
FIG. 8 is an example game selection interface, according to an embodiment of the present invention.

FIG. 8 depicts a game selection interface 600. The game selection interface 600 may be presented in response to initiating a new multi-game gaming session and/or opening a new game group tab. In the example embodiment, the gaming session is configured to divide different game types into different groups, and the game selection interface 600 prompts the player to select a game type associated with the game group. The game types shown in the interface 600 are one example configuration of game types, and additional, fewer, or alternative game types may be provided in other embodiments, including those described elsewhere herein. In some embodiments, the game groups are divided according to additional or alternative criteria, and the selection interface 600 is adjusted accordingly. For example, game types may also be divided into high stakes and low stakes, and separate presentation elements may be provided within the interface 600.

Figure 9:
FIG. 9 is an example multi-game interface in a single game view, according to an embodiment of the present invention.
Figure 10:
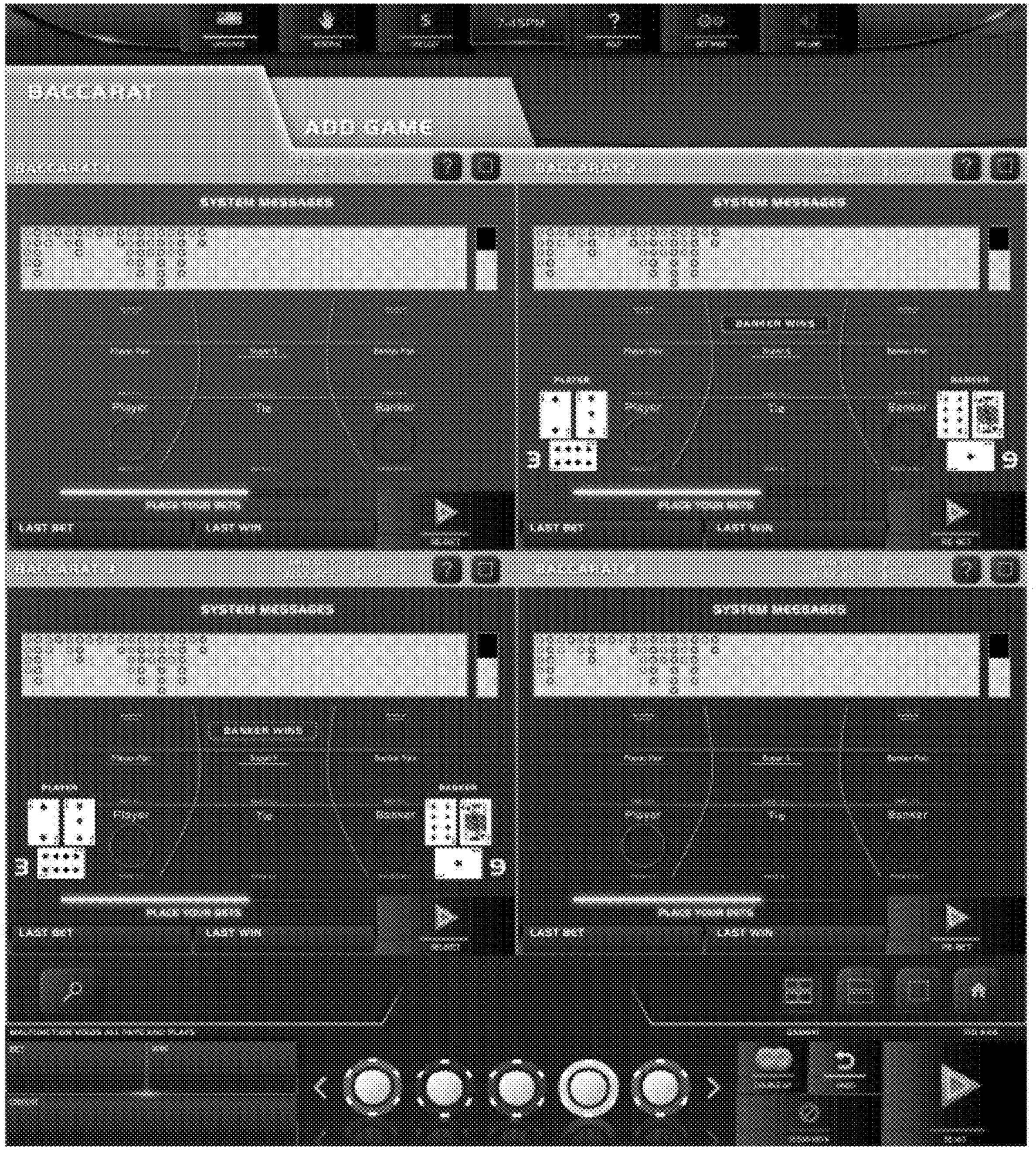
FIG. 10 is an example multi-game interface in a four-game view, according to an embodiment of the present invention.

FIGS. 9 and 10 depict example multi-game interfaces 700, 800. More specifically, the interfaces 700, 800 are for baccarat games. The interface 700 is configured to present one game within a participating game slot, whereas the interface 800 is configured in a quadrant view to present four games concurrently. The amount and arrangement of information and presentation elements for each game may be adjustable according to the current view of the interface. The player can freely switch between views using inputs provided in the bottom right of the interfaces 700, 800. In certain embodiments, the available views may be limited based on the number of games within the participating games slots. That is, if the player is not participating in four games, then the view shown in the interface 700 may not be available. In other embodiments, the view is available, but one of the four quadrants may be empty or otherwise visually indicative that a slot is available for an additional active game.

The multi-game interfaces 700, 800 differ from each other to accommodate different presentation elements, information, and the like. That is, as the interface 700 is focused on one game, the interface 700 may include additional game statistics, presentation elements (e.g., the dealer presentation), and the like relative to each game window of the interface 800. In some embodiments, the information and/or the presentation elements are the same between different views, but the information and presentation elements are scaled to fit within the size of the game window.

The multi-game interfaces 700, 800 include at least some universal inputs for the presented games. For example, graphical icons representing chips or tokens are presented at the bottom of the interfaces 700, 800, and these icons are dragged and dropped by the player within the game windows to indicate certain player actions (e.g., wagers). In at least some embodiments, each game window may also include one or more dedicated inputs, such as an input to re-bet the last wager.

Figure 11:
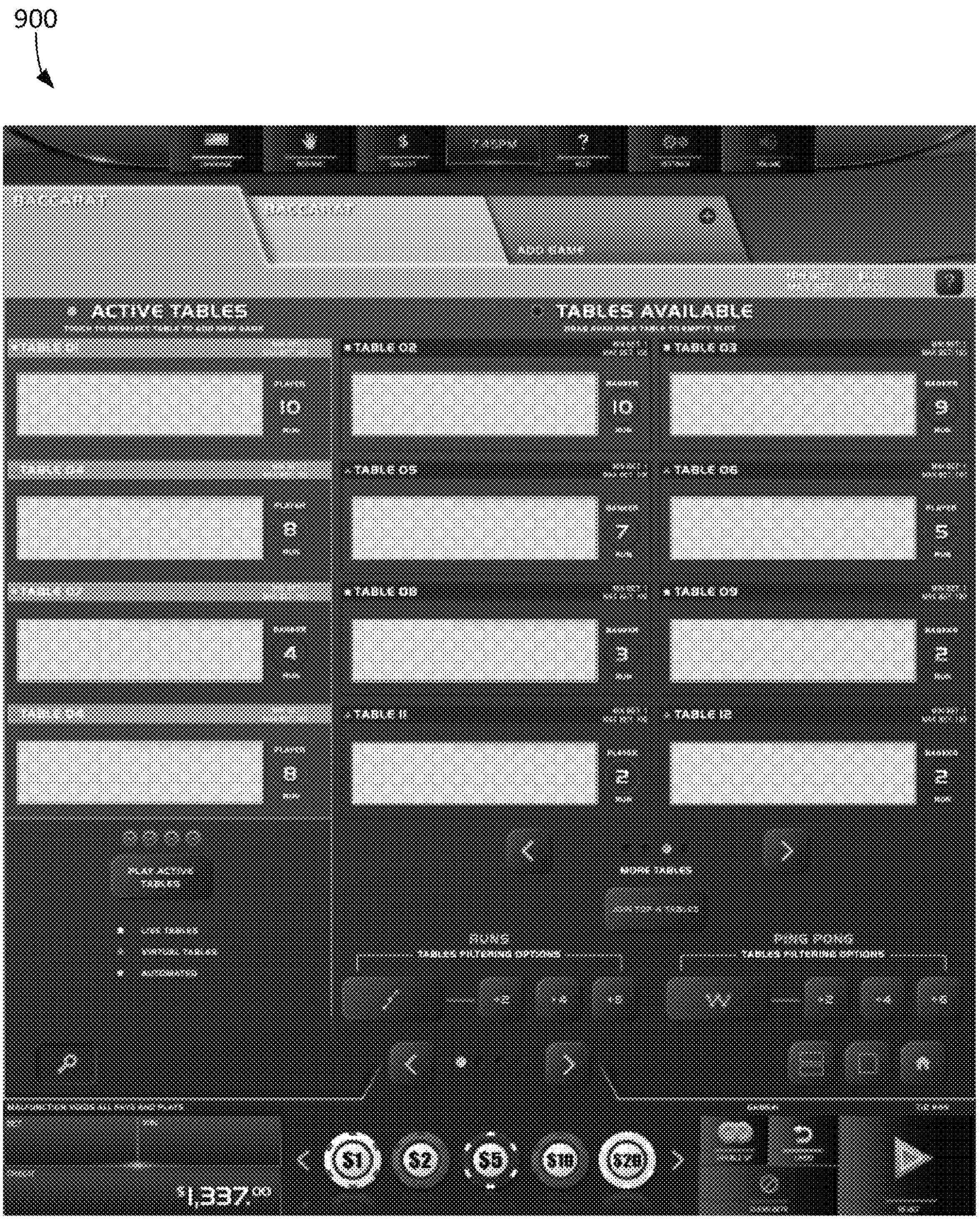
FIG. 11 is an example multi-game management interface, according to an embodiment of the present invention.

FIG. 11 depicts a multi-game management interface 900 for a baccarat multi-game gaming session. The interface 900 may be associated with the interfaces 700, 800 in some embodiments. Similar to FIGS. 5A-5D, the interface 900 in the illustrated state includes four participating game slots ("Active Tables") filled with four active games. The list of active games ("Tables Available") is navigable via navigation arrows below the list. The interface 900 also include inputs for joining the top four tables according to the current sorting of the active games list and inputs for sorting and/or filtering the list according to game trends (e.g., ping pong outcomes and runs). This enables the player to intuitively sort the list of active games to their preferences, thereby improving the navigation and analysis of the list of active games to determine whether or not each game should be added to a participating game slot. Once the player is satisfied with any changes made within the interface 900, the player provides input to swap the interface 900 for a corresponding multi-game interface (or other suitable interface, such as via selecting the other game group) to play the games within the participating game slots.

Figure 12:
FIG. 12 is a multi-game interface for a roulette game, according to an embodiment of the present invention.
Figure 13:
FIG. 13 is a multi-game management interface for a roulette game, according to an embodiment of the present invention.

FIG. 12 depicts a multi-game interface 1000 for roulette games, and FIG. 13 depicts a corresponding multi-game management interface 1100. The interfaces 1000, 1100 share some presentation elements and inputs with the interfaces 700, 900 (shown in FIGS. 9 and 11, respectively), and other presentation elements and/or inputs are adapted to the underlying roulette games. For example, the interface 1000 includes a presentation emulating a roulette table to facilitate player wagers according to the rules of roulette by dragging and dropping chips to the indicia of the table. The interface 1100 includes presentation elements to present statistics of historical game outcomes associated with roulette game outcomes. For other game types, similar changes may be applied to the multi-game interfaces and/or multi-game management interfaces to adapt the interfaces to the rules and presentation of the corresponding game type.

Figure 14:
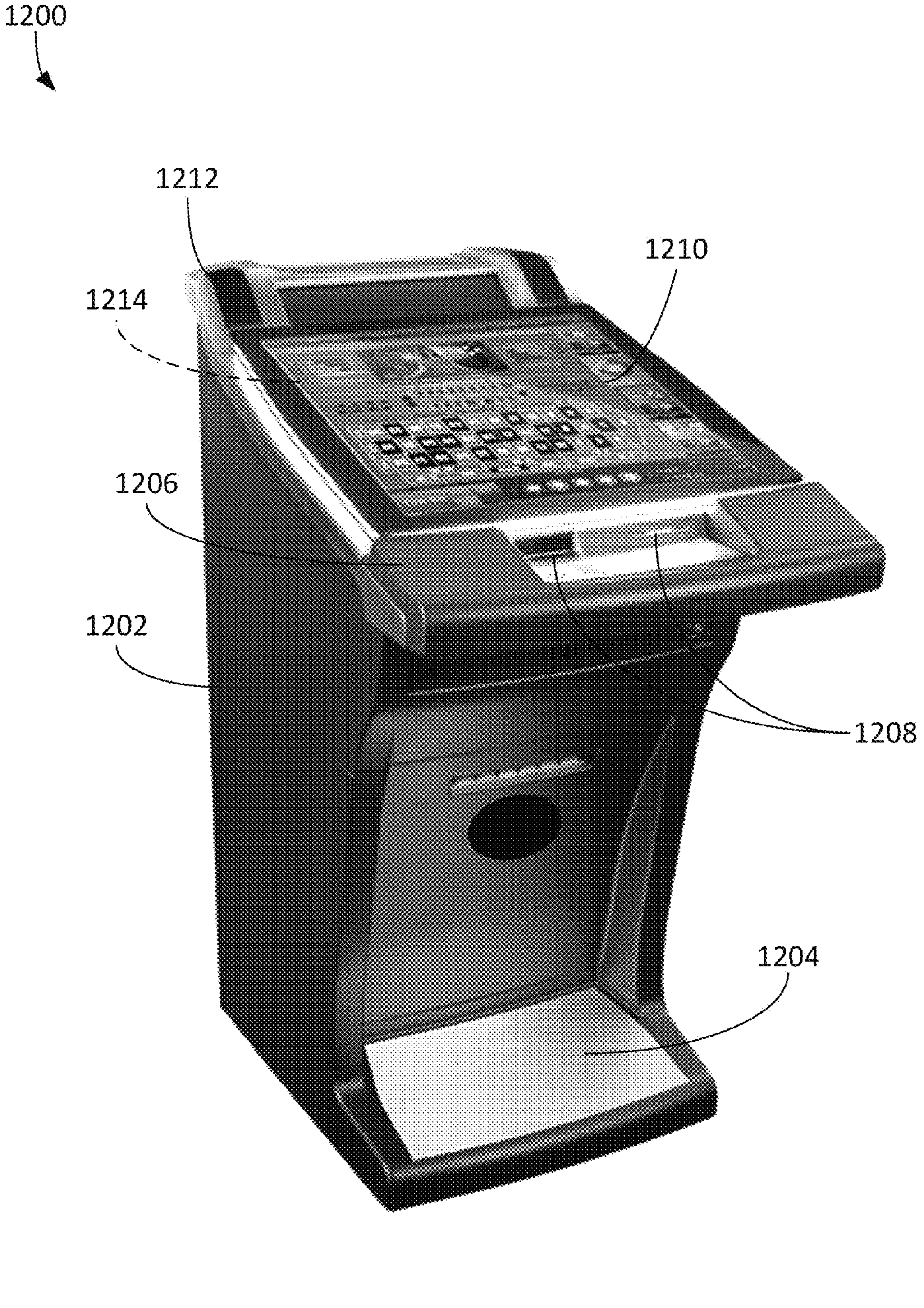
FIG. 14 is a perspective view of an example player terminal for multi-game gaming sessions, according to an embodiment of the present invention.

FIG. 14 depicts another example gaming machine 1200 (referred herein as player terminal 1200) for use in the gaming systems and methods described herein. The player terminal 1200 may be similar to or different from the gaming machine 10 shown in FIG. 1. That is, the components and/or functionality of the gaming machines 10, the player terminal 1200, and/or the gaming machines 102 may be shared between each other, including those components and/or functionalities not explicitly shared between devices as described herein.

The player terminal 1200 includes a cabinet 1202, a footrest 1204, an armrest 1206, one or more credit input/output devices 1208, a display 1210, and a pair of opposing speakers 1212. In other embodiments, the player terminal 1200 may include additional, fewer, or alternative components, including those described elsewhere herein.

The height of the cabinet 1202 may be configured for the player to stand or sit while playing. In the example embodiment, the cabinet 1202 is configured for sitting play. The cabinet includes the footrest 1204 and the armrest 1206 for the player to position himself or herself comfortably at the player terminal 1200. The cabinet 1202 may be configured to be coupled (directly or indirectly through an adapter) to one or more other player terminals to form a bank of player terminals. For example, a bank of player terminals may be combined with one or more community display devices for play of the games described herein.

The cabinet 1202 may form one or more cavities for a plurality of internal components. In at least some embodiments, the player terminal 1200 includes the same or substantially similar internal components to the gaming machine 10, such as game-logic circuitry (not shown in FIG. 14). In other embodiments, the internal components of the player terminal 1200 may be different from the gaming machine 10 to adapt to the specific configuration of the terminal 1200. The game-logic circuitry may include processors, memory devices, communication interfaces, and/or other components for interfacing with other components of the terminal 1200 and other devices. The logic circuitry may be configured to cause the player terminal 1200 to perform the functionality of the terminal 1200 as described herein, which may include managing and/or presenting (e.g., via the display device 1210) multi-game gaming sessions.

The player terminal 1200 includes one or more credit devices 1208 for depositing and/or receiving physical items and/or data representing a credit or monetary value. For example, the credit devices 1208 may include, and without limitation, a bill acceptor, a coin chute, a ticket reader, a ticket dispenser, a card reader, a barcode scanner, a camera (e.g., for scanning QR codes and the like), and/or other suitable sensors for detecting a credit input. The player may provide the physical credit input or a digital credit input (e.g., the player transmits a signal representing the credit input to the player terminal 1200 from his or her phone) to the player terminal 1200 (or another remote device, such as an accounting server) to establish a credit balance for the gaming session at the player terminal 1200. Wagers during the gaming session may reduce the credit balance, and awards from the gaming session may be added to the credit balance. The player may add additional credits to the credit balance by providing an additional credit input. To retrieve the credit balance, the player may initiate a cashout procedure at the player terminal 1200 to transfer any remaining credit to an account of the player, to a physical item representing the remaining credit (e.g., a ticket), or to any other suitable form of credit that may be retrievable by the player. In some embodiments, the devices 1208 may be adapted to receive or output elements other than credits, such as detecting a card or wireless transmitted player identifier to link a player account to the gaming session.

In the example embodiment, the player terminal 1200 includes the display device 1210 and the speakers 1212 to present the multi-game gaming sessions (i.e., a presentation assembly). In at least some embodiments, the player terminal 1200 may include additional or alternative components for presenting the multi-game gaming sessions. For example, the player terminal 1200 may include emotive lighting, additional display devices, and the like. The display device may include a touchscreen 1214 to enable the player to provide player input. The player input may be used, for example, to place wagers, swap between games on the interface, manage the multi-game gaming session, and/or other input suitable for the gaming session. Additionally or alternatively, the player terminal 1200 includes other input devices for receiving player input, such as buttons, knobs, levers, microphones and the like. In some embodiments, the player terminal 1200 includes a presentation assembly with additional or alternative devices, such as assemblies with multiple display devices.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a gaming machine comprising a presentation assembly and one or more player input devices, the presentation assembly configured to present interfaces for a plurality of games; and game-logic circuitry configured to:

cause the presentation assembly to present a multi-game management interface including presentation elements for a plurality of participating game slots, a plurality of active games, and search tools;

collect game data for each game of the plurality of active games, the collected game data at least associated with historical game events and conditions of the game and at least partially presentable within the multi-game management interface;

in response to detecting, via the one or more player input devices, a player selection of a first search tool of the search tools, compare the collected game data for the plurality of active games to predefined search criteria of the first search tool;

cause the presentation assembly to update the presentation elements of the plurality of active games to be organized based on the comparison;

in response to detecting, via the one or more player input devices, player input adding a first game of the plurality of active games, cause the presentation assembly to visually link the presentation element of a first game slot of the plurality of participating game slots with the presentation element of the first game, wherein a player associated with the player input adding the first game is entered as a participant to the first game, the first game playable concurrently with any other games within the plurality of participating game slots via a multi-game interface presented by the presentation assembly; and in response to detecting, via the one or more player input devices, player input removing the first game, cause the presentation assembly to remove the first game from the multi-game interface and unlink the presentation elements of the first game and the first game slot, wherein the player is removed as a participant within the first game responsive to the player input removing the first game.

2. The gaming system of claim 1, wherein the predefined search criteria is associated with a value-based game data element of the game data, wherein the organization of the plurality of active games comprises at least one of sorting or filtering based on the value-based game data element.

3. The gaming system of claim 1, wherein the historical game events and conditions includes one or more historical game outcomes, and wherein the comparison with the predefined search criteria detects the presence of a predetermined game trend based on the one or more historical game outcomes, the active games of the plurality of active games including the predetermined game trend organized with priority on the multi-game management interface.

4. The gaming system of claim 1, wherein the presentation assembly is configured to present a second multi-game interface with a corresponding second multi-game management interface.

5. The gaming system of claim 4, wherein the presentation element of the first game on the second multi-game management interface visually indicates when the presentation element of the first game is currently within the first game slot and the game-logic circuitry prevents the second multi-game management interface from occupying an additional seat of the first game.

6. The gaming system of claim 1, wherein the multi-game interface and the multi-game management interface are presentable by the presentation assembly concurrently.

7. The gaming system of claim 1, wherein a portion of the plurality of active games are visibly hidden from the multi-game management interface, and wherein the game-logic circuitry is configured to cause, in response to detecting a navigation input via the one or more player input devices, the presentation assembly to visibly reveal the hidden portion.

8. The gaming system of claim 1, wherein a number of games within the plurality of active games is greater than a number of slots within the plurality of participating game slots.

9. A method for presenting a multi-game gaming session using a gaming system, the gaming system comprising a presentation assembly configured to present interfaces for a plurality of games, one or more player input devices, and game-logic circuitry, the method comprising:

presenting, by the presentation assembly, a multi-game management interface including presentation elements for a plurality of participating game slots, a plurality of active games, and search tools;

collecting, by the game-logic circuitry, game data for each game of the plurality of active games, the collected game data at least associated with historical game events and conditions of the game and at least partially presentable within the multi-game management interface;

in response to detecting, via the one or more player input devices, a player selection of a first search tool of the search tools, comparing, by the game-logic circuitry, the collected game data for the plurality of active games to predefined search criteria of the first search tool;

updating, by the presentation assembly, the presentation elements of the plurality of active games to be organized based on the comparison;

in response to detecting, via the one or more player input devices, player input adding a first game of the plurality of active games, visually linking, by the presentation assembly, the presentation element of a first game slot of the plurality of participating game slots with the presentation element of the first game, wherein a player associated with the player input adding the first game is entered as a participant to the first game, the first game playable concurrently with any other games within the plurality of participating game slots via a multi-game interface presented by the presentation assembly; and in response to detecting, via the one or more player input devices, player input removing the first game, removing, by the presentation assembly, the first game from the multi-game interface, and unlinking, by the presentation assembly, the presentation elements of the first game and the first game slot, wherein the player is removed as a participant within the first game responsive to the player input removing the first game.

10. The method of claim 9, wherein the predefined search criteria is associated with a value-based game data element of the game data, wherein the organization of the plurality of active games comprises at least one of sorting or filtering based on the value-based game data element.

11. The method of claim 9, wherein the historical game events and conditions includes one or more historical game outcomes, and wherein the comparison with the predefined search criteria detects the presence of a predetermined game trend based on the one or more historical game outcomes, the active games of the plurality of active games including the predetermined game trend organized with priority on the multi-game management interface.

12. The method of claim 9 further comprising presenting, by the presentation assembly, a second multi-game interface with a corresponding second multi-game management interface.

13. The method of claim 12, wherein the presentation element of the first game on the second multi-game management interface visually indicates when the presentation element of the first game is currently within the first game slot and the game-logic circuitry prevents the second multi-game management interface from occupying an additional seat of the first game.

14. The method of claim 9, wherein the multi-game interface and the multi-game management interface are presentable by the presentation assembly concurrently.

15. The method of claim 9, wherein a portion of the plurality of active games are visibly hidden from the multi-game management interface, and wherein the method further comprises visibly revealing, by the presentation assembly in response to detecting a navigation input via the one or more player input devices, the hidden portion.

16. The method of claim 9, wherein a number of games within the plurality of active games is greater than a number of slots within the plurality of participating game slots.

17. A gaming machine comprising:

a presentation assembly configured to present interfaces for a plurality of games;

one or more player input devices; and game-logic circuitry configured to:

cause the presentation assembly to present a multi-game management interface including presentation elements for a plurality of participating game slots, a plurality of active games, and search tools;

collect game data for each game of the plurality of active games, the collected game data at least associated with historical game events and conditions of the game and at least partially presentable within the multi-game management interface;

in response to detecting, via the one or more player input devices, a player selection of a first search tool of the search tools, compare the collected game data for the plurality of active games to predefined search criteria of the first search tool;

cause the presentation assembly to update the presentation elements of the plurality of active games to be organized based on the comparison;

in response to detecting, via the one or more player input devices, player input adding a first game of the plurality of active games, cause the presentation assembly to visually link the presentation element of a first game slot of the plurality of participating game slots with the presentation element of the first game, wherein a player associated with the player input adding the first game is entered as a participant to the first game, the first game playable concurrently with any other games within the plurality of participating game slots via a multi-game interface presented by the presentation assembly; and in response to detecting, via the one or more player input devices, player input removing the first game, cause the presentation assembly to remove the first game from the multi-game interface and unlink the presentation elements of the first game and the first game slot, wherein the player is removed as a participant within the first game responsive to the player input removing the first game.

18. The gaming machine of claim 17, wherein the predefined search criteria is associated with a value-based game data element of the game data, wherein the organization of the plurality of active games comprises at least one of sorting or filtering based on the value-based game data element.

19. The gaming machine of claim 17, wherein the historical game events and conditions includes one or more historical game outcomes, and wherein the comparison with the predefined search criteria detects the presence of a predetermined game trend based on the one or more historical game outcomes, the active games of the plurality of active games including the predetermined game trend organized with priority on the multi-game management interface.

20. The gaming machine of claim 17, wherein the presentation assembly is configured to present a second multi-game interface with a corresponding second multi-game management interface.

21. The gaming machine of claim 20, wherein the presentation element of the first game on the second multi-game management interface visually indicates when the presentation element of the first game is currently within the first game slot and the game-logic circuitry prevents the second multi-game management interface from occupying an additional seat of the first game.

22. The gaming machine of claim 17, wherein the multi-game interface and the multi-game management interface are presentable by the presentation assembly concurrently.

23. The gaming machine of claim 17, wherein a portion of the plurality of active games are visibly hidden from the multi-game management interface, and wherein the game-logic circuitry is configured to cause, in response to detecting a navigation input via the one or more player input devices, the presentation assembly to visibly reveal the hidden portion.

24. The gaming machine of claim 17, wherein a number of games within the plurality of active games is greater than a number of slots within the plurality of participating game slots.

* * * * *